(12) United States Patent
Cousineau et al.

(10) Patent No.: US 8,266,196 B2
(45) Date of Patent: Sep. 11, 2012

(54) FAST FOURIER TRANSFORM TWIDDLE MULTIPLICATION

(75) Inventors: Kevin S. Cousineau, Ramona, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1246 days.

(21) Appl. No.: 11/373,433

(22) Filed: Mar. 10, 2006

(65) Prior Publication Data
US 2006/0248135 A1 Nov. 2, 2006

Related U.S. Application Data

(60) Provisional application No. 60/660,855, filed on Mar. 11, 2005.

(51) Int. Cl.
G06F 17/14 (2006.01)
G06F 15/00 (2006.01)
(52) U.S. Cl. .................. 708/404; 708/409
(58) Field of Classification Search .......... 708/403–404, 708/408–409; 342/196
See application file for complete search history.

(56) References Cited

U.S. PATENT DOCUMENTS

| | | | |
|---|---|---|---|
| 4,736,307 A | 4/1988 | Salb | |
| 4,768,159 A * | 8/1988 | Gray et al. | 708/405 |
| 4,977,533 A * | 12/1990 | Miyabayashi et al. | 708/404 |
| 6,658,441 B1 * | 12/2003 | Kim | 708/404 |
| 6,990,061 B2 | 1/2006 | Deneire et al. | |
| 7,177,297 B2 | 2/2007 | Agrawal et al. | |
| 7,245,603 B1 | 7/2007 | Lucidarme et al. | |
| 7,248,559 B2 | 7/2007 | Ma et al. | |
| 7,315,934 B2 | 1/2008 | Morishita et al. | |
| 7,333,422 B2 | 2/2008 | Amer | |
| 7,461,114 B2 | 12/2008 | Nakazuru et al. | |
| 7,471,745 B2 | 12/2008 | Anim-Appiah et al. | |
| 2002/0010728 A1 | 1/2002 | Stoye | |
| 2002/0165683 A1 | 11/2002 | Lee | |
| 2002/0178195 A1 | 11/2002 | Ryu | |
| 2002/0199078 A1 | 12/2002 | Aizenberg et al. | |

(Continued)

FOREIGN PATENT DOCUMENTS
JP 64073457 3/1989
(Continued)

OTHER PUBLICATIONS

Jia et al., "A Pipelined Shared-Memory Architecture for FFT Processors," 42nd Midwest Symposium on Circuits and Systems, 2000, Aug. 8-11, 1999, pp. 804-807, vol. 2, IEEE, Piscataway, NJ, USA, XP010511072, ISBN: 0-7803-5491-5.

(Continued)

*Primary Examiner* — Chat Do
*Assistant Examiner* — Kevin Hughes
(74) *Attorney, Agent, or Firm* — Ryan N. Farr

(57) ABSTRACT

An FFT engine implementing a cycle count method of applying twiddle multiplications in multi-stages. When implementing a multistage FFT, the intermediate values need to be multiplied by various twiddle factors. The FFT engine utilizes a minimal number of multipliers to perform the twiddle multiplications in an efficient pipeline. Optimizing a number of complex multipliers based on an FFT radix and a number of values in each row of memory allows the FFT function to be performed using a reasonable amount of area and in a minimal number of cycles. Strategic ordering and grouping of the values allows the FFT operation to be performed in a fewer number of cycles.

40 Claims, 20 Drawing Sheets

U.S. PATENT DOCUMENTS

| | | | |
|---|---|---|---|
| 2003/0128141 A1 | 7/2003 | Asami | |
| 2003/0142764 A1 | 7/2003 | Keevill et al. | |
| 2004/0059766 A1 | 3/2004 | Yeh | |
| 2004/0138870 A1 | 7/2004 | Chan | |
| 2004/0172435 A1 | 9/2004 | Goel | |
| 2004/0243656 A1 | 12/2004 | Sung et al. | |
| 2005/0182806 A1* | 8/2005 | Krishnamoorthi et al. | 708/404 |
| 2005/0289207 A1* | 12/2005 | Lee et al. | 708/404 |
| 2006/0085497 A1 | 4/2006 | Sehitoglu | |
| 2006/0095490 A1 | 5/2006 | Hansen et al. | |
| 2006/0095492 A1 | 5/2006 | Brown et al. | |
| 2006/0221810 A1 | 10/2006 | Vrcelj et al. | |
| 2006/0224650 A1 | 10/2006 | Cousineau | |
| 2006/0274854 A1 | 12/2006 | Matsumoto et al. | |
| 2007/0239815 A1 | 10/2007 | Cousineau et al. | |

FOREIGN PATENT DOCUMENTS

| | | |
|---|---|---|
| JP | 3100863 A | 4/1991 |
| JP | 5040777 A | 2/1993 |
| JP | 10283341 | 10/1998 |
| JP | 11203272 | 7/1999 |
| JP | 2000122999 | 4/2000 |
| JP | 2002132747 | 5/2002 |
| JP | 2004320168 | 11/2004 |
| WO | WO2004004265 | 1/2004 |
| WO | WO2004093360 | 10/2004 |
| WO | 2005057423 | 6/2005 |
| WO | WO2005079033 | 8/2005 |

OTHER PUBLICATIONS

Lin et al., "A 1-GS/s FFT/IFFT Processor for UWB Applications," IEEE Journal of Solid-State Circuits, Aug. 2005, pp. 1726-1735, vol. 40, No. 8, IEEE Service Center, Piscataway, NJ, USA, XP011136758, ISSN: 0018-9200.

Lin et al., "A Dynamic Scaling FFT Processor for DVB-T Applications," IEEE Journal of Solid-State Circuits, Nov. 2004, pp. 2005-2013, vol. 39, No. 11, IEEE Service Center, Piscataway, NJ, USA, XP011121128, ISSN: 0018-9200.

International Search Report, PCT/US06/009469, International Search Authority, European Patent Office, Feb. 21, 2008.

Written Opinion, PCT/US06/009469, International Search Authority, European Patent Office, Feb. 21, 2008.

International Preliminary Report on Patentability, PCT/US06/009469, The International Bureau of WIPO, Geneva, Switzerland, Mar. 4, 2008.

Rabiner-Bernard Gold, Lawrence R., *Theory and Application of Digital Signal Processing*, 1975, pp. 579-594, Prentice-Hall International, Inc.

Analog Devices, Inc., *Digital Signal Processing Application—Using The ADSP-2100 Family*, 1992, pp. 305-306, Prentice-Hall International, Inc.

Alasti, H. et al.: "A Discrete Multi Carrier Multiple Access Technique for Wireless Communications," Vehicular Technology Conference, 1998. VTC 98. 48th IEEE Ottawa, Ont., Canada May 18-21, 1998, 19980518; 19980518-19980521, vol. 2, pp. 1533-1537, XP010288028, New York, NY, USA, IEEE, US.

Frescura, F. et al.: "DSP Based Ofdm Demodulator and Equalizer for Professional DV-T Receivers," IEEE Transactions on Broadcasting, Sep. 1999, pp. 323-332, vol. 45, No. 3, IEEE Service Center, Piscataway, NJ, USA, XP011083078, ISSN: 0018-9316.

Shalan, M. et al.: "A Dynamic Memory Management Unit for Embedded Real-Time System-on-a-Chip," Proceedings of the 2000 International Conference on Compilers, Architecture and Synthesis for Embedded Systems, Nov. 17-19, 2000, pp. 180186, San Jose, CA, USA, XP002467045.

Son, B. et al.: "A High-Speed Fft Processor for OFDM Systems," Proceedings of the 2002 IEEE International Symposium on Circuits and Systems (ISCAS 2002), May 26-29, 2002, pp. 281-284, vol. 3, Scottsdale, AZ, USA, XP002396821.

Office Action in Japan application 2008-501070 corresponding to U.S. Appl. No. 11/373,433, citing JP5040777 and JP3100863 dated Mar. 11, 2011 (050571U2JP).

\* cited by examiner

FIG. 14

| cycle_count | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| mem_addr | 0R | 1R | 2R | 3R | 4R | 5R | 6R | 7R | | | | | | 0W | 1W | 2W | 3W | 4W | 5W | 6W | 7W |
| fft_din | | 0 | 1 | 2 | 3 | 4 | 5 | 6 | 7 | | | | | | | | | | | | |
| core_reg | | | 0 | 1 | 2 | 3 | 4 | 5 | 6 | 7 | | | | | | | | | | | |
| bf_reg | | | | 0 | 1 | 2 | 3 | 4 | 5 | 6 | 7 | | | | | | | | | | |
| reg_we(bf) | | | | 0 | 1 | 2 | 3 | 4 | 5 | 6 | 7 | | | | | | | | | | |
| regout (col) | | | | | 0 | 1 | 2 | 3 | 4 | 5 | 6 | 7 | | | | | | | | | |
| tw_addr | | | | | | | | | | | | | | | | | | | | | |
| tw_din | | | | 1 | 2 | 3 | 4 | 5 | 6 | 7 | 8 | 9 | 10 | 11 | 12 | 13 | 14 | | | | |
| tw_reg | | | | | 1 | 2 | 3 | 4 | 5 | 6 | 7 | 8 | 9 | 10 | 11 | 12 | 13 | 14 | | | |
| cm in/out/we | | | | | | 1 | 2 | 3 | 4 | 5 | 6 | 7 | 8 | 9 | 10 | 11 | 12 | 13 | 14 | | |
| norm_row | | | | | | | | | | | | | 0 | 1 | 2 | 3 | 4 | 5 | 6 | 7 | |
| reg_dout | | | | | | | | | | | | | | 0 | 1 | 2 | 3 | 4 | 5 | 6 | 7 |

FIG. 15

| cycle_cnt | 0 | 1 | 2 | 3 | 4 | 5 | 6 | 7 | 8 | 9 | 10 |
|---|---|---|---|---|---|---|---|---|---|---|---|
| fft_addr | 0R | 0R | 0R | 0R | | | | 0W | 0W | 0W | 0W |
| fft_intl | | 0R | 2R | 4R | 6R | | | 0W | 2W | 4W | 6W |
| fft_din | | 0 | 2 | 4 | 6 | | | | | | |
| reg_row | | | 0 | 1 | 2 | 3 | | | | | |
| col_to_bf | | | | | | 0/1 | 2/3 | 4/5 | 6/7 | | |
| bf/ reg_we | | | | | | 1 | 1 | 1 | 1 | | |
| ift_norm | | | | | | | 0/1 | 2/3 | 4/5 | 6/7 | |
| ift_n xxxx | | | | | | | | 0/1 | 2/3 | 4/5 | 6/7 |
| reg_dout | | | | | | | | 0 | 2 | 4 | 6 |

FIG. 16

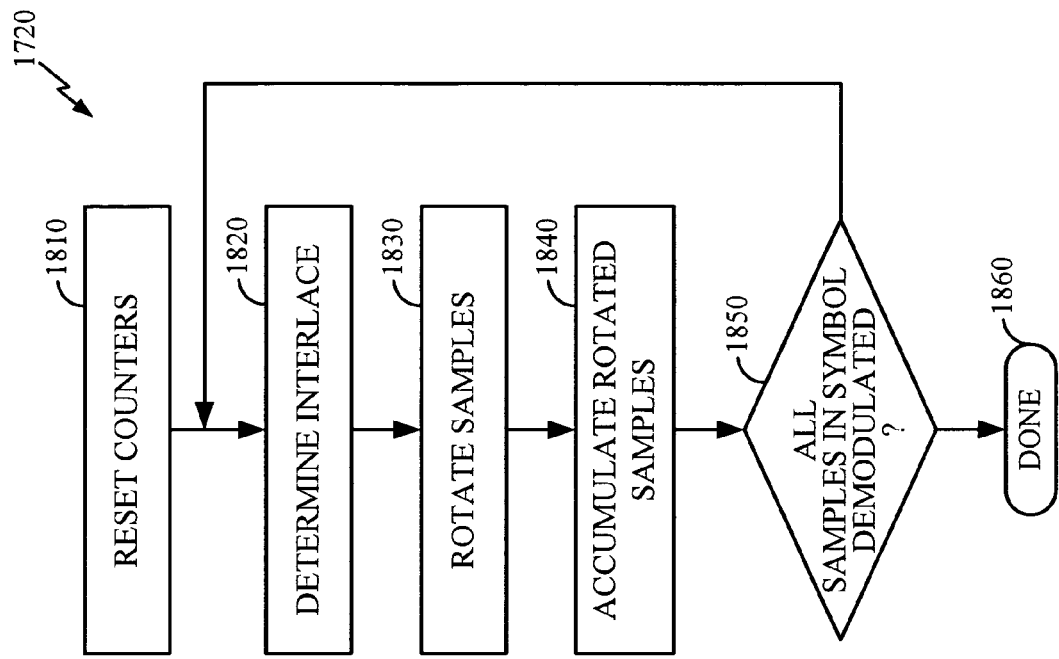
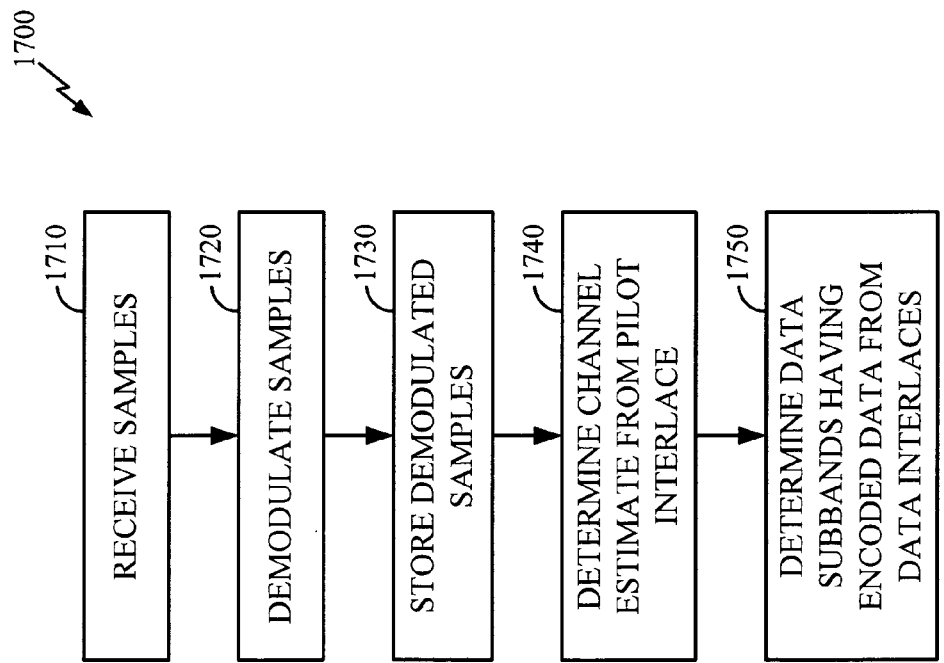

FAST FOURIER TRANSFORM TWIDDLE MULTIPLICATION

CROSS-REFERENCES TO RELATED APPLICATIONS

The present application claims priority to Provisional Application No. 60/660,855, entitled "FAST FOURIER TRANSFORM" filed Mar. 11, 2005, and assigned to the assignee hereof and expressly incorporated by reference herein.

The present application is related to Non-Provisional U.S. patent application entitled "FAST FOURIER TRANSFORM PROCESSING IN AN OFDM SYSTEM" application Ser. No. 11/372,578, filed Mar. 10, 2006, and expressly incorporated by reference herein.

BACKGROUND

I. Field

The disclosure relates to the field of wireless communications and processing of wireless communication signals. More particularly, the disclosure relates to Fast Fourier Transform (FFT) processing of Orthogonal Frequency Division Multiplex (OFDM) signals.

II. Background

Orthogonal Frequency Division Multiplex (OFDM) is a multi-carrier modulation technique that effectively partitions the overall system bandwidth into multiple (N) orthogonal subbands. These subbands may also be referred to as tones, subcarriers, bins, and frequency channels. With OFDM, each subband is associated with a respective subcarrier that may be modulated with data.

In a wireless communication system, a radio frequency (RF) modulated signal may travel via a number of signal paths from a transmitter to a receiver. If the signal paths have different delays, then the received signal at the receiver would include multiple instances of the transmitted signal with different gains and delays. This time dispersion in the wireless channel causes frequency selective fading, which is characterized by a frequency response that varies across the system bandwidth. For an OFDM system, the N subbands may thus experience different effective channels and may consequently be associated with different complex channel gains.

The processing of OFDM systems can be considerably more involved compared to processing of received signals in other communication systems. The large amount of processing required puts a large burden on the receiver, in terms of processing capabilities. An ability to increase the processing capabilities in an OFDM receiver is desirable to allow for greater proliferation of communication systems utilizing the modulation scheme.

BRIEF SUMMARY

An FFT processor for an OFDM receiver and methods for processing received symbols in an OFDM system is described herein. The FFT processor includes multiple interrelated operational blocks configured to perform data demodulation, channel estimation, and fine timing acquisition on received OFDM symbols. The FFT processor incorporates a pipelined FFT engine using a memory architecture shared with channel estimation and demodulation blocks. The combination of the shared memory structure and the pipelined FFT operation enable the channel estimation and demodulation processing to be completed during the time used to capture the next received symbol.

The shared memory can be arranged as multiple memory banks that are associated with the functional blocks they support. The timing of the FFT processor dictates the operation of the memory banks, data and control multiplexers that are used to address the various banks.

A pipelined FFT engine is a backbone of the FFT processor and is used in the channel estimation and time acquisition processes performed by the FFT processor. The channel estimation values are used in subsequent processing of the underlying data.

An FFT engine implementing a cycle count method of applying twiddle multiplications in multi-stages is described. When implementing a multistage FFT, such as an implementation based on a radix-8 core, the intermediate values need to be multiplied by various twiddle factors. The FFT engine utilizes a minimal number of multipliers to perform the twiddle multiplications in an efficient pipeline. Optimizing a number of complex multipliers based on an FFT radix and a number of values in each row of memory allows the FFT function to be performed using a reasonable amount of area and in a minimal number of cycles. Strategic ordering and grouping of the values allows the FFT operation to be performed in a fewer number of cycles.

An aspect includes an FFT processing apparatus that includes a sample memory having a number of samples values stored in each row equal to a radix of the FFT, a transpose memory, a butterfly core configured to receive a row of values from the sample memory, perform a butterfly operation on the values, and write results to a column of the transpose memory, and a multiplier module configured to retrieve a predetermined number of adjacent values from the transpose memory and multiply each of the values with a twiddle factor.

Another aspect includes an FFT processing apparatus that includes a sample memory adapted to store eight complex sample values in each row, a transpose memory arranged as 8×8 storage locations, a radix-8 butterfly core adapted to retrieve a row of values, perform the radix-8 butterfly, and write output values columnwise into the transpose memory, twiddle memory adapted to store four twiddle values in each row, and a multiplier module having four complex multipliers, the multiplier module adapted to retrieve a row from the twiddle memory and four adjacent values from the transpose memory, perform a complex multiplication on the four values from adjacent transpose memory locations using values from the twiddle memory row, and write the product back to the four adjacent transpose memory locations.

Another aspect includes a method of performing an FFT processing operation. The method includes reading a plurality of rows of sample memory equal to a radix of the FFT, determining the butterflies for values in a row of the sample memory and writing the butterfly values columnwise to a transpose memory, retrieving a row of twiddle factors having a plurality of twiddle factor values stored in the row, multiplying a plurality of butterfly values with the twiddle factor values in a single cycle to generate twiddled butterfly values, and writing the twiddled butterfly values back to memory locations of the plurality of butterfly values.

Another aspect includes an FFT processing apparatus that includes means for storing a number of samples values stored in each row equal to a radix of the FFT, means for transposing a plurality of values, means for computing a butterfly configured to receive a row of values from the sample memory, perform a butterfly operation on the values, and write results to a column of the transpose memory, and means for multiplying a predetermined number of adjacent values from the transpose memory with a corresponding a twiddle factor.

Another aspect includes a tangible computer-readable storage medium encoded with a computer program to perform the steps of reading a plurality of rows of sample memory equal to a radix of the FFT, determining the butterflies for values in a row of the sample memory and writing the butterfly values columnwise to a transpose memory, retrieving a row of twiddle factors having a plurality of twiddle factor values stored in the row, multiplying a plurality of butterfly values with the twiddle factor values in a single cycle to generate twiddled butterfly values, and writing the twiddled butterfly values back to memory locations of the plurality of butterfly values.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 14 is a simplified representation of twiddle multiplication order in a radix-8 FFT.

FIG. 15 is a simplified timing diagram of a pipelined radix-8 FFT operation.

FIG. 16 is a simplified timing diagram of a pipelined 256-point FFT

FIG. 17 is a simplified flowchart of a method of processing an OFDM signal.

FIG. 18 is a simplified flowchart of a method of demodulating symbol samples.

DETAILED DESCRIPTION OF EMBODIMENTS OF THE INVENTION

Figure 1:
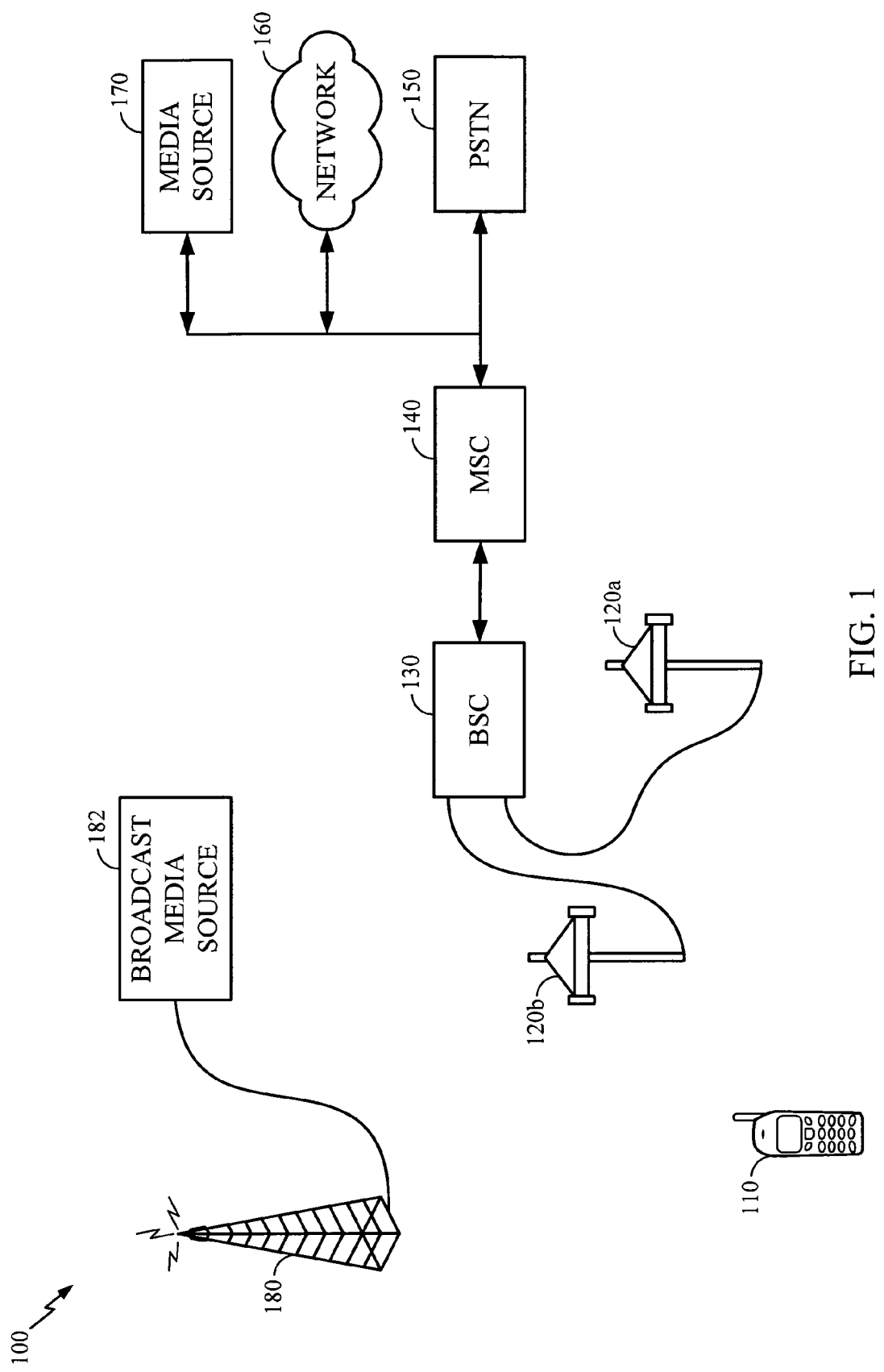
FIG. 1 is a functional block diagram of an embodiment of a wireless communication system.

FIG. 1 is a simplified functional block diagram of an embodiment of a wireless communication system 100. The system includes one or more fixed elements that can be in communication with a user terminal 110. The user terminal 110 can be, for example, a wireless telephone configured to operate according to one or more communication standards. For example, the user terminal 110 can be configured to receive wireless telephone signals from a first communication network and can be configured to receive data and information from a second communication network.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 150 can also be configured to coordinate inter-system handoffs with other communication systems (not shown).

The wireless communication system 100 can also include a broadcast transmitter 180 that is configured to transmit a signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters. Although only one broadcast transmitter 180 is shown in the wireless communication system 100, the wireless communication system 100 can be configured to support multiple broadcast transmitters 180.

A plurality of broadcast transmitters 180 can transmit signals in overlapping coverage areas. A user terminal 110 can concurrently receive signals from a plurality of broadcast transmitters 180. The plurality of broadcast transmitters 180 can be configured to broadcast identical, distinct, or similar broadcast signals. For example, a second broadcast transmitter having a coverage area that overlaps the coverage area of the first broadcast transmitter may also broadcast a subset of the information broadcast by a first broadcast transmitter.

The broadcast transmitter 180 can be configured to receive data from a broadcast media source 182 and can be configured to encode the data, modulate a signal based on the encoded data, and broadcast the modulated data to a service area where it can be received by the user terminal 110.

In one embodiment, one or both of the base stations 120a and 120b and the broadcast transmitter 180 transmits an Orthogonal Frequency Division Multiplex (OFDM) signal. The OFDM signals can include a plurality of OFDM symbols modulated to one or more carriers at predetermined operating bands.

An OFDM communication system utilizes OFDM for data and pilot transmission. OFDM is a multi-carrier modulation technique that partitions the overall system bandwidth into multiple (K) orthogonal frequency subbands. These subbands are also called tones, carriers, subcarriers, bins, and frequency channels. With OFDM, each subband is associated with a respective subcarrier that may be modulated with data.

A transmitter in the OFDM system, such as the broadcast transmitter 180, may transmit multiple data streams simultaneously to wireless devices. These data streams may be continuous or bursty in nature, may have fixed or variable data rates, and may use the same or different coding and modulation schemes. The transmitter may also transmit a pilot to assist the wireless devices perform a number of functions such as time synchronization, frequency tracking, channel estimation, and so on. A pilot is a transmission that is known a priori by both a transmitter and a receiver.

The broadcast transmitter 180 can transmit OFDM symbols according to an interlace subband structure. The OFDM interlace structure includes K total subbands, where K>1. U subbands may be used for data and pilot transmission and are called usable subbands, where U≦K. The remaining G subbands are not used and are called guard subbands, where G=K−U. As an example, the system may utilize an OFDM structure with K=4096 total subbands, U=4000 usable subbands, and G=96 guard subbands. For simplicity, the following description assumes that all K total subbands are usable and are assigned indices of 0 through K−1, so that U=K and G=0.

The K total subbands may be arranged into M interlaces or non-overlapping subband sets. The M interlaces are non-overlapping or disjoint in that each of the K total subbands belongs to only one interlace. Each interlace contains P subbands, where P=K/M. The P subbands in each interlace may be uniformly distributed across the K total subbands such that consecutive subbands in the interlace are spaced apart by M subbands. For example, interlace 0 may contain subbands 0, M, 2M, and so on, interlace 1 may contain subbands 1, M+1, 2M+1, and so on, and interlace M−1 may contain subbands M−1, 2M−1, 3M−1, and so on. For the exemplary OFDM structure described above with K=4096, M=8 interlaces may be formed, and each interlace may contain P=512 subbands that are evenly spaced apart by eight subbands. The P subbands in each interlace are thus interlaced with the P subbands in each of the other M−1 interlaces.

In general, the broadcast transmitter 180 can implement any OFDM structure with any number of total, usable, and guard subbands. Any number of interlaces may also be formed. Each interlace may contain any number of subbands and any one of the K total subbands. The interlaces may contain the same or different numbers of subbands. For simplicity, much of the following description is for an interlace subband structure with M=8 interlaces and each interlace containing P=512 uniformly distributed subbands. This subband structure provides several advantages. First, frequency diversity is achieved since each interlace contains subbands taken from across the entire system bandwidth. Second, a wireless device can recover data or pilot sent on a given interlace by performing a partial P-point fast Fourier transform (FFT) instead of a full K-point FFT, which can simplify the processing at the wireless device.

The broadcast transmitter 180 may transmit a frequency division multiplexed (FDM) pilot on one or more interlaces to allow the wireless devices to perform various functions such as channel estimation, frequency tracking, time tracking, and so on. The pilot is made up modulation symbols that are known a priori by both the base station and the wireless devices, which are also called pilot symbols. The user terminal 110 can estimate the frequency response of a wireless channel based on the received pilot symbols and the known transmitted pilot symbols. The user terminal 110 is able to sample the frequency spectrum of the wireless channel at each subband used for pilot transmission.

The system 100 can define M slots in the OFDM system to facilitate the mapping of data streams to interlaces. Each slot may be viewed as a transmission unit or a mean for sending data or pilot. A slot used for data is called a data slot, and a slot used for pilot is called a pilot slot. The M slots may be assigned indices 0 through M−1. Slot 0 may be used for pilot, and slots 1 through M−1 may be used for data. The data streams may be sent on slots 1 through M−1. The use of slots with fixed indices can simplify the allocation of slots to data streams. Each slot may be mapped to one interlace in one time interval. The M slots may be mapped to different ones of the M interlaces in different time intervals based on any slot-to-interlace mapping scheme that can achieve frequency diversity and good channel estimation and detection performance. In general, a time interval may span one or multiple symbol periods. The following description assumes that a time interval spans one symbol period.

Figure 2:
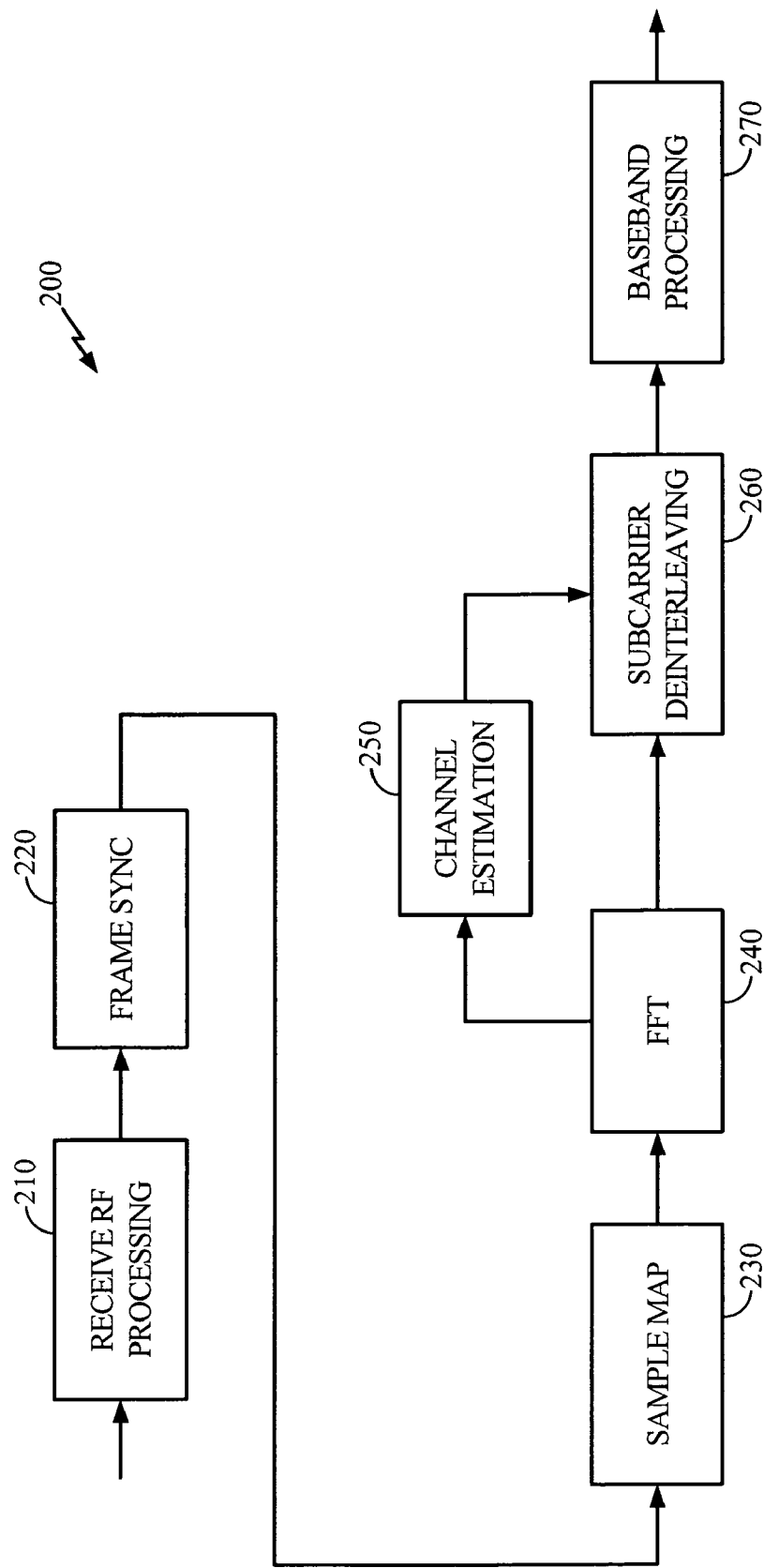
FIG. 2 is a simplified functional block diagram of an embodiment of a n OFDM receiver.

FIG. 2 is a simplified functional block diagram of an OFDM receiver 200 that can be implemented, for example, in the user terminal of FIG. 1. The receiver 200 can be configured to implement a FFT processing block as described herein to perform processing of received OFDM symbols.

The receiver 200 includes a receive RF processor 210 configured to receive the transmitted RF OFDM symbols over an RF channel, process them and frequency convert them to baseband OFDM symbols or substantially baseband signals. A signal can be referred to as substantially a baseband signal if the frequency offset from a baseband signal is a fraction of the signal bandwidth, or if signal is at a sufficiently low intermediate frequency to allow direct processing of the signal without further frequency conversion. The OFDM symbols from the receive RF processor 210 are coupled to a frame synchronizer 220.

The frame synchronizer 220 can be configured to synchronize the receiver 200 with the symbol timing. In an embodiment, the frame synchronizer can be configured to synchronize the receiver to the superframe timing and to the symbol timing within the superframe.

The frame synchronizer 220 can be configured to determine an interlace based on a number of symbols required for a slot to interlace mapping to repeat. In one embodiment, a slot to interlace mapping may repeat after every 14 symbols. The frame synchronizer 220 can determine the modulo-14 symbol index from the symbol count. The receiver 200 can use the modulo-14 symbol index to determine the pilot interlace as well as the one or more interlaces corresponding to assigned data slots.

The frame synchronizer 220 can synchronize the receiver timing based on a number of factors and using any of a number of techniques. For example, the frame synchronizer 220 can demodulate the OFDM symbols and can determine the superframe timing from the demodulated symbols. In another embodiment, the frame synchronizer 220 can determine the superframe timing based on information received within one or more symbols, for example, in an overhead channel. In another embodiment, the frame synchronizer 220 can synchronize the receiver 200 by receiving information over a distinct channel, such as by demodulating an overhead channel that is received distinct from the OFDM symbols. Of course, the frame synchronizer 220 can use any manner of achieving synchronization, and the manner of achieving synchronization does not necessarily limit the manner of determining the modulo symbol count.

The output of the frame synchronizer 220 is coupled to a sample map 230 that can be configured to demodulate the OFDM symbol and map the symbol samples or chips from a serial data path to any one of a plurality of parallel data paths. For example, the sample map 220 can be configured to map each of the OFDM chips to one of a plurality of parallel data paths corresponding to the number of subbands or subcarriers in the OFDM system.

The output of the sample map 230 is coupled to an FFT module 240 that is configured to transform the OFDM symbols to the corresponding frequency domain subbands. The FFT module 240 can be configured to determine the interlace corresponding to the pilot slot based on the modulo-14 symbol count. The FFT module 240 can be configured to couple one or more subbands, such as predetermined pilot subbands, to a channel estimator 250. The pilot subbands can be, for example, one or more equally spaced sets of OFDM subbands spanning the bandwidth of the OFDM symbol.

The channel estimator 250 is configured to use the pilot subbands to estimate the various channels that have an effect on the received OFDM symbols. In one embodiment, the channel estimator 250 can be configured to determine a channel estimate corresponding to each of the data subbands.

The subbands from the FFT module 240 and the channel estimates are coupled to a subcarrier symbol deinterleaver 260. The symbol deinterleaver 260 can be configured to determine the interlaces based on knowledge of the one or more assigned data slots, and the interleaved subbands corresponding to the assigned data slots.

The symbol deinterleaver 260 can be configured, for example, to demodulate each of the subcarriers corresponding to the assigned data interlace and generate a serial data stream from the demodulated data. In another embodiment, the symbol deinterleaver 260 can be configured to demodulate each of the subcarriers corresponding to the assigned data interlace and generate a parallel data stream. In yet another embodiment, the symbol deinterleaver 260 can be configured to generate a parallel data stream of the data interlaces corresponding to the assigned slots.

The output of the symbol deinterleaver 260 is coupled to a baseband processor 270 configured to further process the received data. For example, the baseband processor 270 can be configured to process the received data into a multimedia data stream having audio and video. The baseband processor 270 can send the processed signals to one or more output devices (not shown).

Figure 3:
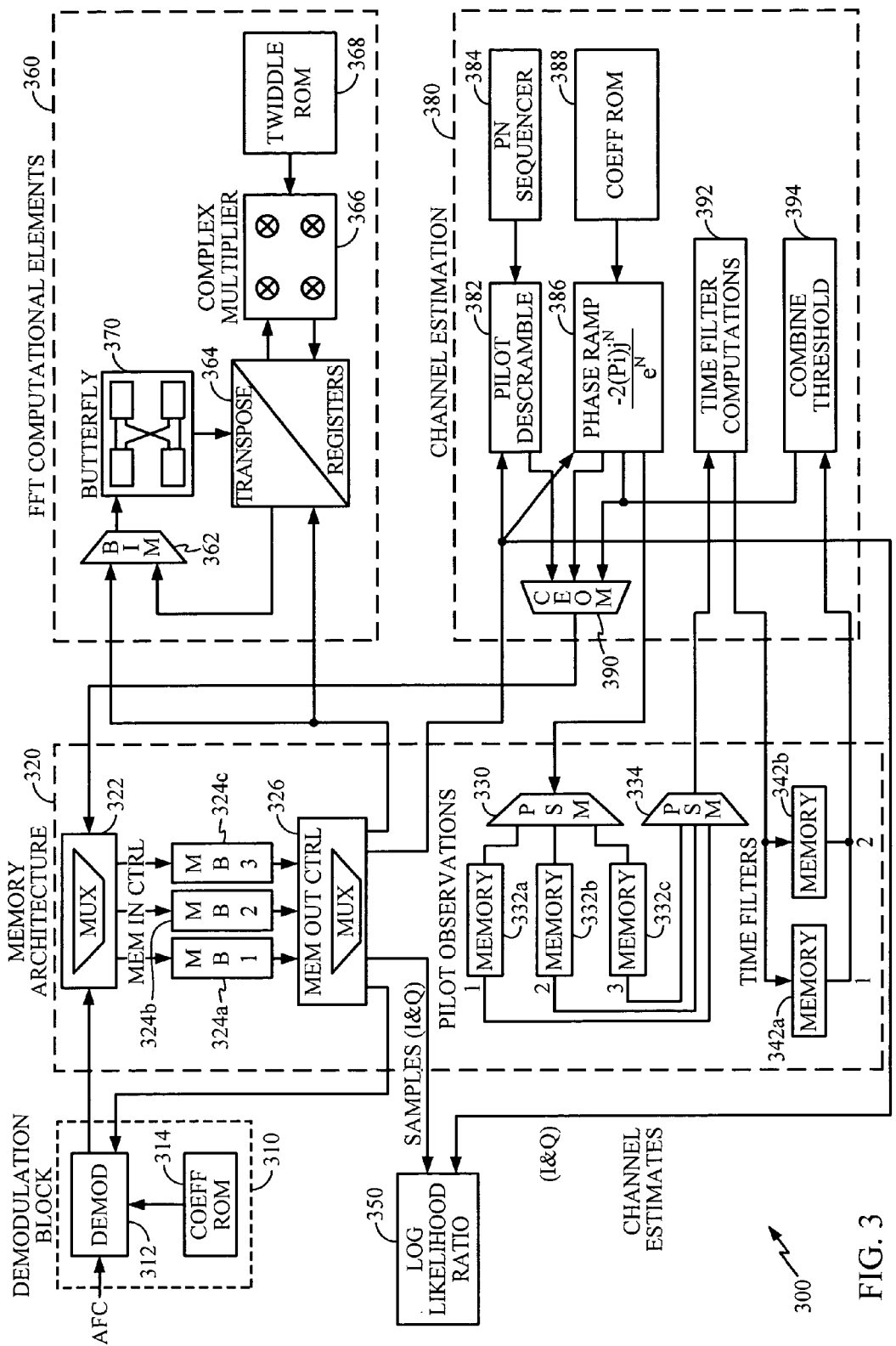
FIG. 3 is a simplified functional block diagram of an embodiment of an FFT processor for an OFDM system.

FIG. 3 is a simplified functional block diagram of an embodiment of an FFT processor 300 for a receiver operating in an OFDM system. The FFT processor 300 can be used, for example, in the wireless communication system of FIG. 1 or in the receiver of FIG. 2. In an embodiment, the FFT processor 300 can be configured to perform portions or all of the functions of the frame synchronizer, FFT module, and channel estimator of the receiver embodiment of FIG. 2.

The FFT processor 300 can be implemented in an Integrated Circuit (IC) on a single IC substrate to provide a single chip solution for the processing portion of OFDM receiver designs. Alternatively, the FFT processor 300 can be implemented on a plurality of ICs or substrates and packaged as one or more chips or modules. For example, the FFT processor 300 can have processing portions performed on a first IC and the processing portions can interface with memory that is on one or more storage devices distinct from the first IC.

The FFT processor 300 includes a demodulation block 310 coupled to a memory architecture 320 that interconnects an FFT computational block 360 and a channel estimator 380. A log likelihood ratio block 350 may optionally be included as part of the FFT processor 300, or may be implemented within a distinct block that may or may not be implemented on the same substrate or ICs as the FFT processor 300.

The demodulation, FFT, channel estimate and Log Likelihood Ratio modules perform operations on sample values. The memory architecture 320 allows for any of these modules to access any block at a given time. The switching logic is simplified by temporally dividing the memory banks.

One bank of memory is used repeatedly by the demodulation block 310. The FFT computational block 320 accesses the bank actively being processed. The channel estimate block 380 accesses the pilot information of the bank currently being processed. The log likelihood ratio (LLR) block 350 accesses the bank containing the oldest samples.

The demodulation block 310 includes a demodulator 312 coupled to a coefficient ROM 314. The demodulation block 310 processes the time synchronized OFDM symbols to recover the pilot and data interlaces. In the example described above, OFDM symbol includes 4096 subbands divided into 8 distinct interlaces, where each interlace has subbands uniformly spaced across the entire 4096 subbands.

The demodulator 312 organizes the incoming 4096 samples into the eight interlaces. The demodulator rotates each incoming sample by $w(n)=e^{-j2\pi n/512}$, with n representing interlaces 0 through 7. The first 512 values are rotated and stored in each interlace. For each set of 512 samples that follow, the demodulator 312 rotates and then adds the values. Each memory location in each interlace will have accumulated eight rotated samples. Values in interlace 0 are not rotated, just accumulated. The demodulator 312 can represent the rotated and accumulated values in a larger number of bits than are used to represent the input samples to accommodate growth due to accumulation and rotation.

The coefficient ROM 314 is used to store the complex rotation coefficients. Seven coefficients are required for each incoming sample, as interlace 0 does not require any rotation. The coefficient ROM 314 can be rising-edge triggered, which can result in a 1-cycle delay from when the demodulation block 310 receives the sample.

The demodulation block 310 can be configured to register each coefficient value retrieved from coefficient ROM 314. The act of registering the coefficient value adds another cycle delay before the coefficient values themselves can be used.

For each incoming sample, seven different coefficients are used, each with a different address. Seven counters are used to look up the different coefficients. Each counter is incremented by its interlace number; for every new sample, for example, interlace 1 increments by 1, while interlace 7 increments by 7. It is typically not practical to create a ROM image to hold all of the seven coefficients required in a single row or to use seven different ROMs. Therefore, the demodulation pipeline starts by fetching coefficient values when a new sample arrives.

To reduce the size of the coefficient memory, only the COS and SIN values between 0 and $\pi/4$ are stored. The three most-significant bits (MSBs) of the coefficient address that are not sent to the memory can be used to direct the values to the appropriate quadrants. Thus, values read from the coefficient ROM 314 are not registered immediately.

The memory architecture 320 includes an input multiplexer 322 coupled to multiple memory banks 324a-324c. The memory banks 324a-324c are coupled to a memory control block 326 that includes a multiplexer capable of routing values from each of the memory banks 324a-324c to a variety of modules.

The memory architecture 320 also includes memory and control for pilot observation processing. The memory architecture 320 includes an input pilot selection multiplexer 330 coupling pilot observations to any one of a plurality of pilot observation memory 332a-332c. The plurality of pilot observation memory 332a-332c is coupled to an output pilot selection multiplexer 334 to allow contents of any of the memory to be selected for processing. The memory architecture 320 can also include a plurality of memory portions 342a-342b to store processed channel estimates determined from the pilot observations.

The orthogonal frequencies used to generate an OFDM symbol can conveniently be processed using a Fourier Transform, such as an FFT. An FFT computational block 360 can include a number of elements configured to perform efficient FFT and Inverse-FFT (IFFT) operations of one or more predetermined dimensions. Typically the dimensions are powers of two, but FFT or IFFT operations are not limited to dimensions that are powers of two.

The FFT computational block 360 includes a butterfly core 370 that can operate on complex data retrieved from the memory architecture 320 or transpose registers 364. The FFT computational block 360 includes a butterfly input multiplexer 362 that is configured to select between the memory architecture 320 and the transpose registers 354. The butterfly core 370 operates in conjunction with a complex multiplier 366 and twiddle memory 368 to perform the butterfly operations.

The channel estimator 380 can include a pilot descrambler 382 operating in conjunction with PN sequencer 384 to descramble pilot samples. A phase ramp module 386 operates to rotate pilot observations from a pilot interlace to any of the various data interlaces. Phase ramp coefficient memory 388 is used to store the phase ramp information needed to rotate the samples to the desired frequencies.

A time filter 392 can be configured to time filter multiple pilot observations over multiple symbols. The filtered outputs from the time filter 392 can be stored in the memory architecture 320 and further processed by a thresholder 394 prior to being returned to the memory architecture 320 for use in the log likelihood ratio block 350 that performs the decoding of the underlying subband data.

The channel estimator 380 can include a channel estimation output multiplexer 390 to interface various channel estimator output values, including intermediate and final output values, to the memory architecture 320.

Figure 4:
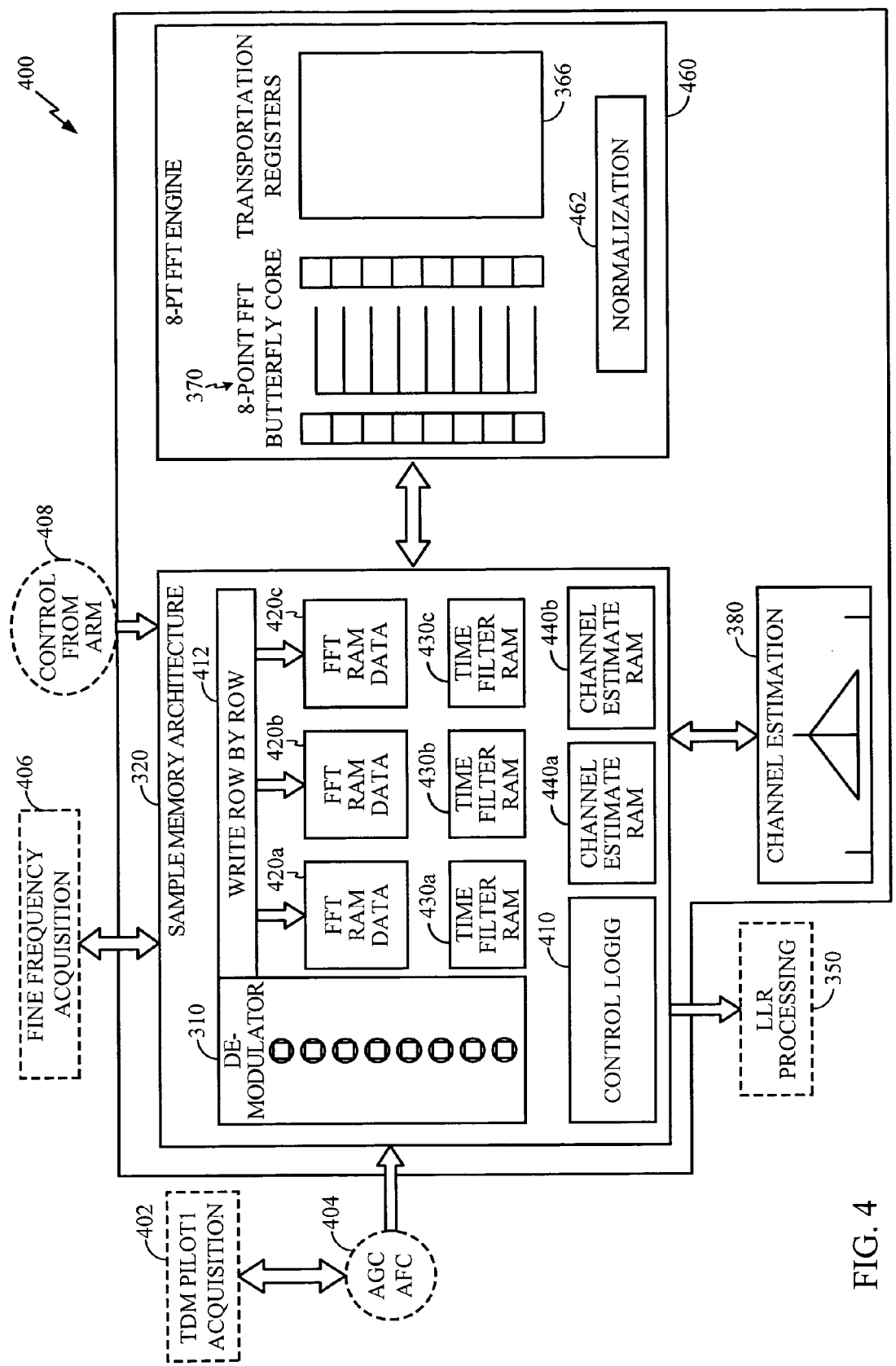
FIG. 4 is a simplified functional block diagram of an embodiment of an FFT processor for an OFDM system.

FIG. 4 is a simplified functional block diagram of an embodiment of an FFT processor 400 in relation to other signal processing blocks in an OFDM receiver. The TDM pilot acquisition module 402 generates an initial symbol synchronization and timing for the FFT processor 400. Incoming in-phase (I) and quadrature (Q) samples are coupled to the AGC module 404 that operates to implement gain and frequency control loops that maintain the signal within a desired amplitude and frequency error.

The FFT processor 400 can be used to provide timing and frequency information to a fine frequency acquisition module 406 to maintain more accurate symbol frequencies than can be obtained using the AFC function of the AGC module 404. A control processor 408 performs high level control of the FFT processor 400. The control processor 408 can be, for example, a general purpose processor or a Reduced Instruction Set Computer (RISC) processor, such as those designed by ARM™. The control processor 408 can, for example, control the operation of the FFT processor 408 by controlling the symbol synchronization, selectively controlling the state of the FFT processor 400 to active or sleep states, or otherwise controlling the operation of the FFT processor 400.

Control logic 410 within the FFT processor 400 can be used to interface the various internal modules of the FFT processor 400. The control logic 410 can also include logic for interfacing with the other modules external to the FFT processor 400.

The I and Q samples are coupled to the FFT processor 400, and more particularly, to the demodulation block 310 of the FFT processor 400. The demodulation block 310 operates to separate the samples to the predetermined number of interlaces. The demodulation block 310 interfaces with the memory architecture 320 to store the samples for processing and delivery to a log likelihood ratio block 350 for decoding of the underlying data.

The memory architecture 320 can include a memory controller 412 for controlling the access of the various memory banks within the memory architecture 320. For example, the memory controller 412 can be configured to allow row writes to locations within the various memory banks.

The memory architecture 320 can include a plurality of FFT RAM 420a-420c for storing the FFT data. Additionally, a plurality of time filter memory 430a-430c can be used to store time filter data, such as pilot observations used to generate channel estimates.

Separate channel estimate memory 440a-440b can be used to store intermediate channel estimate results from the channel estimator 380. The channel estimator 380 can use the channel estimate memory 440a-440b when determining the channel estimates.

The FFT processor 400 includes an FFT computational block that is used to perform at least portions of the FFT operation. In the embodiment of FIG. 4, the FFT computational block is an 8-point FFT engine 460. An 8-point FFT engine 460 can be advantageous for processing the illustrative example of the OFDM symbol structure described above. As described earlier, each OFDM symbol includes 4096 subbands divided into 8 interlaces of 512 subbands each. The number of subbands in each interlace, 512, is the cube of 8 ($8^3=512$). Thus, a 512-point FFT can be performed in three stages using a radix-8 FFT. In fact, because 4096 is the fourth power of 8, a 4096-point FFT can be performed with just one additional FFT stage, for a total of four stages.

The 8-point FFT engine 460 can include a butterfly core 370 and transpose registers 364 adapted to perform a radix-8 FFT. A normalization block 462 is used to normalize the products generated by the butterfly core 370. The normalization block 462 can operate to limit the bit growth of the memory locations needed to represent the values output from the butterfly core following each stage of the FFT.

Figure 5:
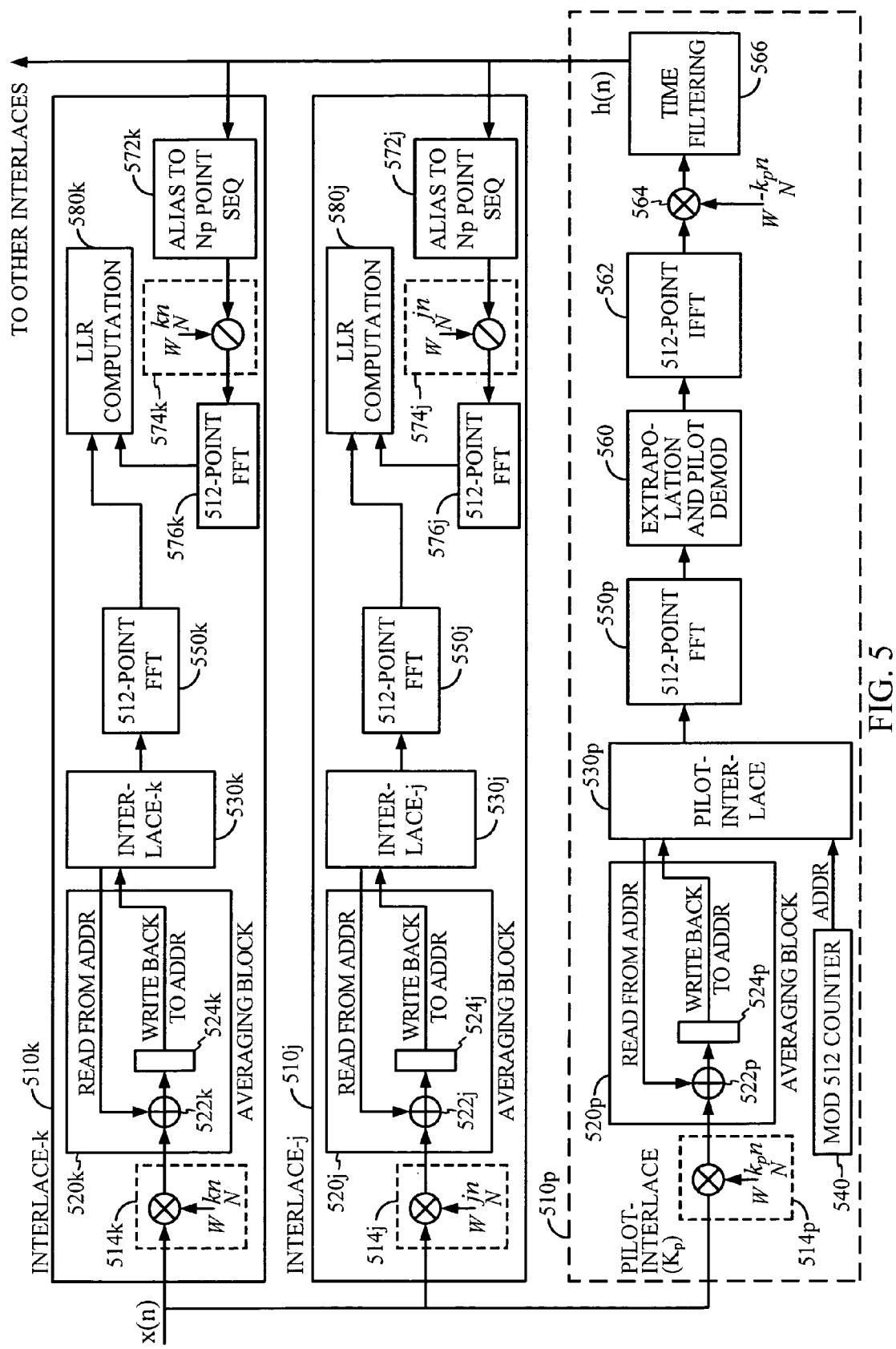
FIG. 5 is a simplified functional block diagram of an embodiment of OFDM interlace processing.

FIG. 5 is a simplified functional block diagram of an embodiment of OFDM interlace processing. The FFT processors of FIG. 3 or 4 can be configured to perform the OFDM interlace processing shown in FIG. 5. The simplified functional block diagram illustrates two data interlace processors 510k and 510j, and a single pilot interlace processor 510p.

However, an FFT processor can implement any number of interlace processors depending on the number of interlaces in the OFDM symbols. For example, to process the previously described OFDM symbol embodiment, the FFT processor can incorporate seven data interlace processors, such as 510*k*, and one pilot interlace processor 510*p*.

Each of the data interlace processors 510*k*, 510*j*, is similarly arranged and effectively can operate on any of the data interlaces. Each data interlace processor 510*k*, 510*j*, includes a rotator 514*k*, 514*j* that is configured to rotate the phase of the incoming samples. The phase rotation effectively rotates each interlace to a common interlace used for processing. Each data interlace processor 510*k*, 510*j* operates on one sample out of each consecutive M samples, where M represents the total number of interlaces.

The output of each rotator 514*k*, 514*j*, is coupled to an accumulator 520*k*, 520*j*, that accumulates the samples over the eight interlaces. For an OFDM symbol having 4096 subbands and 8 interlaces, each interlace includes 512 subbands, and the accumulator 520*k*, 520*j* sums 8 instances of 512 samples. In the described OFDM symbol example, the first 512 values are rotated and stored for each interlace. For each set of 512 samples that follow, the rotator 514*k*, 514*j* rotates the samples and the accumulator 520*k*, 520*j* adds the values to the previously stored sample. Each of 512 memory location in each interlace will have accumulated eight rotated samples.

The data interlace processors 510*k*, 510*j*, include memory 530*k*, 530*j*, for storing the accumulated samples, or intermediate values of the accumulated samples. In one example, each memory 530*k*, 530*j*, can store 512 samples, or accumulated samples. At the beginning of each symbol, the memory locations are reset or overwritten with the first set of data interlace samples.

A counter 540 can be used to point to the position in memory 530*k*, 530*j*, where the input value is accessed and where accumulated value is to be returned. Although FIG. 5 shows only one modulo-512 counter 540 coupled to the pilot sample memory 530*p*, the counter 540 can supply the count values to each of the memory 530*k*, 530*j*, used to store accumulated data samples. Alternatively, each data interlace processor 510*k*, 510*j*, can include a separate counter or one or more data interlace processors 510*k*, 510*j*, can share a counter that is common with or distinct from the counter 540 used by the pilot interlace processor 510*p*.

In one embodiment, the counter 540 is reset at the start of each symbol. Similarly, the data memory 530*k*, 530*j*, and pilot sample memory 530*p* can be reset or otherwise cleared at the start of every symbol. The rotator 514*k*, 514*j*, rotates the desired interlace samples by the predetermined phase and couples the rotated sample to the associated accumulator 520*k*, 520*j*. The accumulator 520*k*, 520*n* includes an adder 522*k*, 522*j*, that reads from memory 530*k*, 530*j*, the previously accumulated value pointed to by the counter 540.

The adder 522*k*, 522*j*, sums the retrieved value with the value from the rotator 514*k*, 514*j*. The accumulator 520*k*, 520*j*, loads the sum into a register 524*k*, 524*j*, prior to writing it back to the same memory location that was used to supply the input to the adder 522*k*, 522*j*.

The counter 540 advances after all interlaces have processed a sample. Thus, the count can remain the same for each cycle through the entire number of interlaces, including the pilot interlace.

An FFT module 550*k*, 550*j*, performs an FFT on the accumulated interlace data stored in the memory 530*k*, 530*j*. In the example of FIG. 5, the FFT module 550*k*, 550*j* performs a 512-point FFT on the 512 accumulated samples. The output of the 512-point FFT module 550*k*, 550*j* represents the subbands of the data interlace.

The output of the 512-point FFT module 550*k*, 550*j*, is coupled to an associated Log Likelihood Ratio (LLR) block 580*k*, 580*j*, where each of the subbands having information can be decoded. Although the FFT processors and the data interlace processors 510*k*, 510*j*, described herein implement an LLR block 580*k*, 580*j*, for decoding the subbands, other FFT processors can use other types of decoders. The type of decoder selected for the FFT processor can depend, in part, on the encoding process used at the transmitter. For example, an FFT processor can use a Viterbi decoder if the data is convolutionally encoded.

The LLR block 580*k*, 580*j*, can decode the subband data using a channel estimate generated in part by the pilot interlace processor 510*p*. In the example shown in FIG. 5, the pilot interlace processor 510*p* includes a rotator 510*p* and accumulator 520*p* as did each of the data interlace processors 510*k*, 510*j*.

The accumulator 520*p* accumulates the pilot samples in memory 530*p* in the same manner as is done in the data interlace processors 510*k*, 510*j*. An FFT module 550*p* performs a 512-point FFT on the accumulated pilot samples to transform the time domain representation to the frequency domain pilot subbands.

The output of the FFT module 550*p* is coupled to a pilot extrapolation and demodulation module 560. The OFDM system can define predetermined guard bands near the band edges of the frequency subband definitions to ensure that transmissions do not extend beyond the allocated bandwidth. No pilot or data information is transmitted on the subbands within the guard bands.

The pilot extrapolation and demodulation module 560 can operate to extrapolate the values in the pilot subbands to estimate pilot values in subbands in the guard bands. The extrapolation can occur prior to a pilot demodulation in which the pilot subbbands are demodulated to recover the channel estimate. The pilot subbands are modulated with known symbols or sequences. The known symbols or sequence can be scrambled by a pseudorandom sequence, and the pilot extrapolation and demodulation module 560 can descramble the pilot subbands during the demodulation process.

The demodulated, extrapolated, pilot subbands represent the raw channel estimates in the pilot subbands. An IFFT module 562 operates on the raw channel estimates to transform the channel estimates to a channel impulse response. In the example of FIG. 5, the IFFT module 562 performs a 512-point IFFT, thereby generating a 512-tap channel impulse response.

The channel impulse response is coupled to a rotator 564 that performs substantially the opposite rotation performed by the initial rotator 514*p* in the pilot interlace processor 510*p*. The output of the rotator 564 is coupled to a time filter 566, where the channel impulse response can be time filtered. The time filter 566 can be configured to filter the channel impulse response based in part on the present channel impulse response and additional channel impulse response values. The additional channel impulse response values can include past channel impulse response values as well as future channel impulse response values, where a future channel impulse response value represents a channel impulse based on a subsequent received OFDM symbol.

The FFT processor can store multiple symbol samples and can determine a channel impulse response for each of the stored symbols. The time filter 566 can thus implement a non-causal filter by storing a sufficient number of OFDM symbols and determining each of their channel estimates. Thus, the time filter can operate on channel estimates determined sufficiently in the past to allow the sampling and processing of subsequent symbols that represent "future" symbols with respect to the filtered channel impulse response.

Of course, the time filter 566 can implement virtually any type of filter, including a FIR, IIR or some other type of filter. Additionally, the time filter 566 can implement a causal or non-causal filter response.

The time filtered pilot impulse response is coupled to each of the data interlace processors 510k, 510j, where it is further filtered or processed depending on parameters related to the individual data interlace. The pilot filter 572k, 572j, can operate to truncate the pilot impulse response or threshold the various impulse response taps based in part on the particular data interlace.

The output of the pilot filter 572k, 572j, is coupled to a rotator 574k, 574j that rotates the pilot impulse response to the particular data interlace. The output of the rotator 574k, 574j, is coupled to a FFT module 576k, 576j, where the final channel impulse response is transformed to a channel frequency response estimate at the data interlace frequencies. The channel frequency response estimates are coupled to the LLR blocks 580k, 580j, for use in decoding the subbands of the data interlaces.

Figure 6:
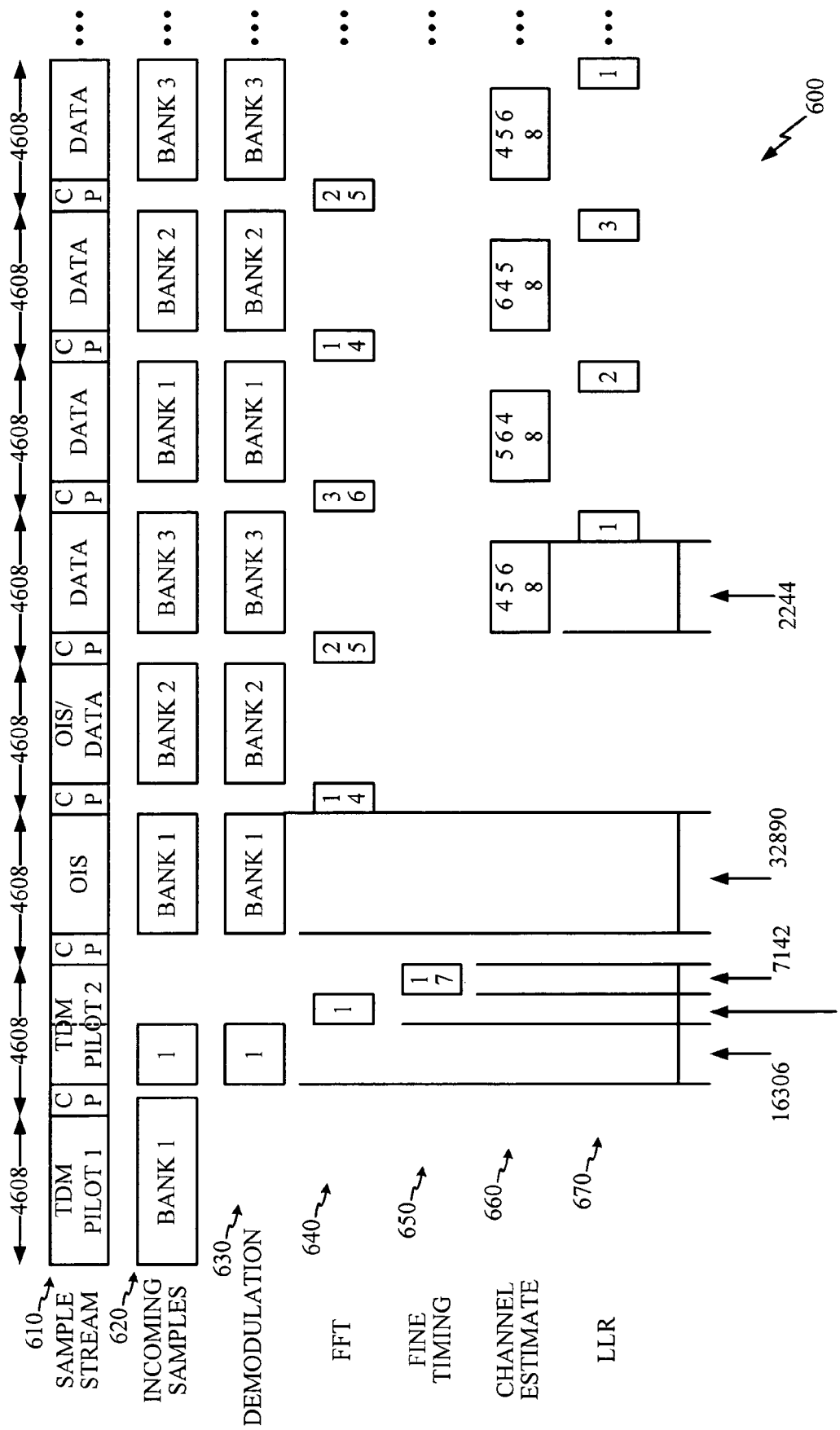
FIG. 6 is a simplified timeline of shared memory usage in an OFDM processor.

FIG. 6 is a simplified timeline 600 of shared memory usage in an OFDM processor. The memory architecture of the FFT processor can be arranged as multiple banks. In an embodiment of an FFT processor, such as the FT processor of FIG. 3 or FIG. 4, the memory can be arranged as 8 distinct banks. Banks 1, 2, and 3 are for incoming samples. Banks 4, 5, and 6 store pilot information. Bank 7 stores Fine Frequency results, and Bank 8 stores Channel Estimate results. The timeline 600 dictates the operation of the memory bank address, data, and control multiplexers.

The timeline 600 illustrates an example frame structure of an input sample stream 610. The incoming sample stream 610 can be arranged in a particular order. Each symbol of information, for example 612, is separated from adjacent symbol by a cyclic prefix 614. Some of the symbols can include data that span the entire symbol period, while other symbols can have data that can be captured in less than an entire symbol period.

Incoming sample storage 620 directs the incoming samples 620 to one of memory banks 1, 2, or 3. Initial TDM pilot and overhead (OIS) information is stored in memory bank 1. Thereafter, the incoming samples are cycled through memory banks 1, 2, and 3.

Demodulation 620 operates on the memory bank storing the current incoming samples. The FFT engine 640 operates after the symbols have been captured and utilizes memory bank 1 and cycles through memory banks 4, 5, and 6.

The fine timing operation 650 occurs during one half of the TDM pilot 2 symbol and operates using banks 1 and 7. The channel estimate operation 660 operates on the FFT results in memory banks 4, 5, and 6 and also uses memory bank 8 for the result. The LLR block 670 cycles through the memory banks used for the incoming samples.

The timeline 600 shows how the memory banks are shared among the multiple operations of the FFT processor. The timeline 600 shows how the timing of the multiple operations are dependent upon one another.

The sample memory control logic determines whether any data for a symbol should be processed. If there is no data to be processed, the incoming samples for that symbol time will not be demodulated, stored, or processed. However, in the symbol before the start of the desired data, the pilot signal is demodulated for channel estimation.

The timing of the various operations in the FFT processor creates a number of data dependencies. The FFT and fine timing blocks must finish before the start of OIS information. Specifically, the fine timing block must be ready with one cycle before the first OIS symbol data is received. The FFT, Channel Estimation, and LLR blocks must finish in less time than it takes incoming samples to fill up a memory bank.

The FFT processor has sufficient memory to hold three symbols of data. The channel-estimation algorithm requires pilot information from the symbols before, during, and after the symbol currently being processed for data. Samples consisting of data values interlaced with pilot values arrive serially. No processing can be performed until the entire symbol has been received. Therefore, sufficient memory is required to hold three symbols of data.

Three memory blocks can be used to capture incoming symbols in the following manner. The first memory, for example Bank 1, collects the incoming samples from the AFC block. The second memory, for example Bank 2, holds data values. This memory is used by the different computational engines in the FFT processing unit—the FFT core and Channel Estimation blocks. The third memory, for example Bank 3, holds symbol interlace data. This memory is used to perform most of the calculations.

Received samples are stored in a specific order, columnwise, to optimize FFT processing. The 4096 samples are divided into eight blocks. Block 0 contains pilot information, while blocks 1 through 7 can contain data.

The radix-8 FFT engine requires eight samples to be input into its butterfly circuit. By grouping these eight samples in a single memory row, the radix-8 FFT engine can compute values every cycle.

For incoming sample data, the appropriate line of a memory bank is fetched. One value in the line of eight is updated before being written back. Three stages are required for the radix-8 to perform a 512-point FFT. Different sets of eight rows of memory are accessed to perform the 512-point FFT.

In addition to the sample memories described earlier, the channel estimation block uses five additional memories. Each memory is 512 samples in size, with 64 rows and eight samples per row. Three channel estimate memories hold past, present, and future pilot observations. The other two channel estimate memories hold the outputs for the two time-filter circuits. The final output of the channel estimation block is stored back in the pilot interlace of the sample memory's active bank.

Figure 7:
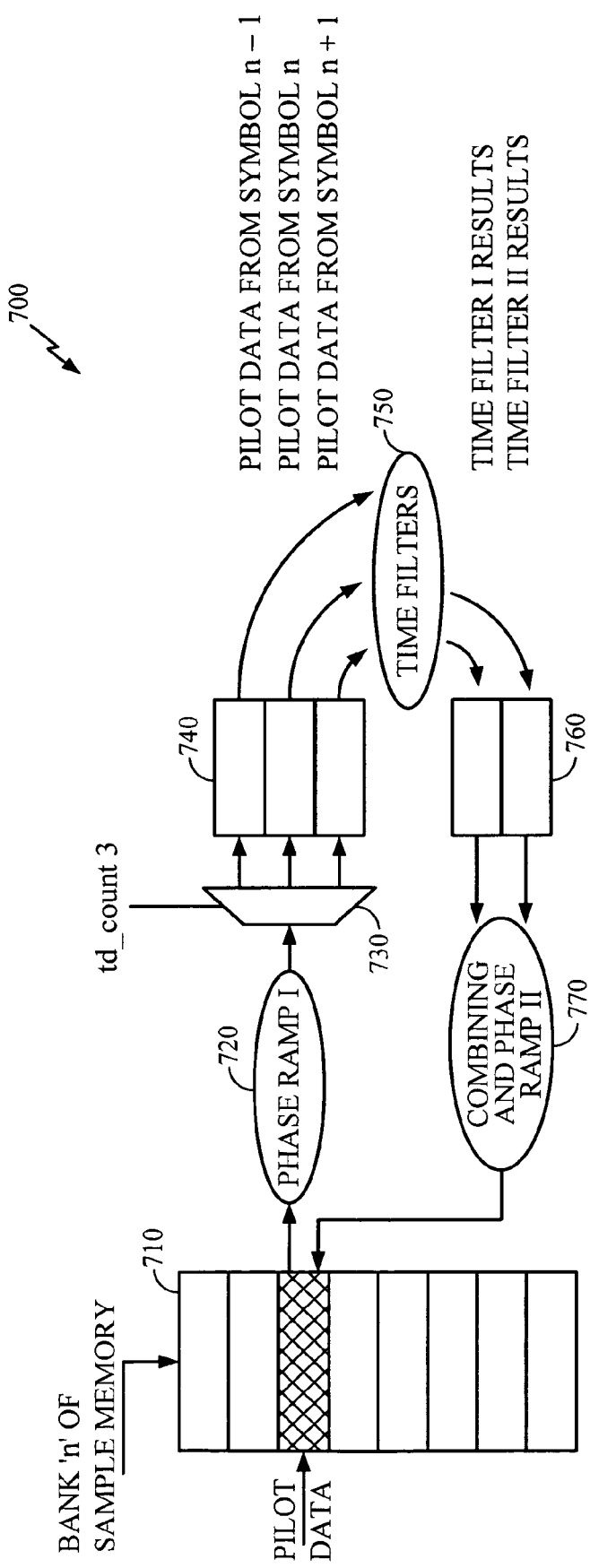
FIG. 7 is a simplified functional block diagram of an embodiment of pilot channel processing.

FIG. 7 a simplified functional block diagram of pilot processing using the shared memories. Pilot data is read from memory storing the sample memory pilot interlace 710. The pilot data is rotated in a rotator 720 and stored in one of three channel estimate memories 740. A counter increments every symbol when there is active data and indicates to a multiplexer 730 which of the three channel estimate memories 740 in which to store the pilot data.

The channel estimates stored in the channel estimate memories 740 are used in the time filter 750 to generate a time filtered channel estimate. The time filter 750 can generate multiple time filtered channel estimates, and can store the multiple time filtered channel estimates in corresponding filtered channel estimate memory 760.

A second rotator 770 can combine or otherwise select the filtered channel estimates and can rotate the combined channel estimates. The resultant channel estimates are returned to the bank of the sample memory.

Figure 8:
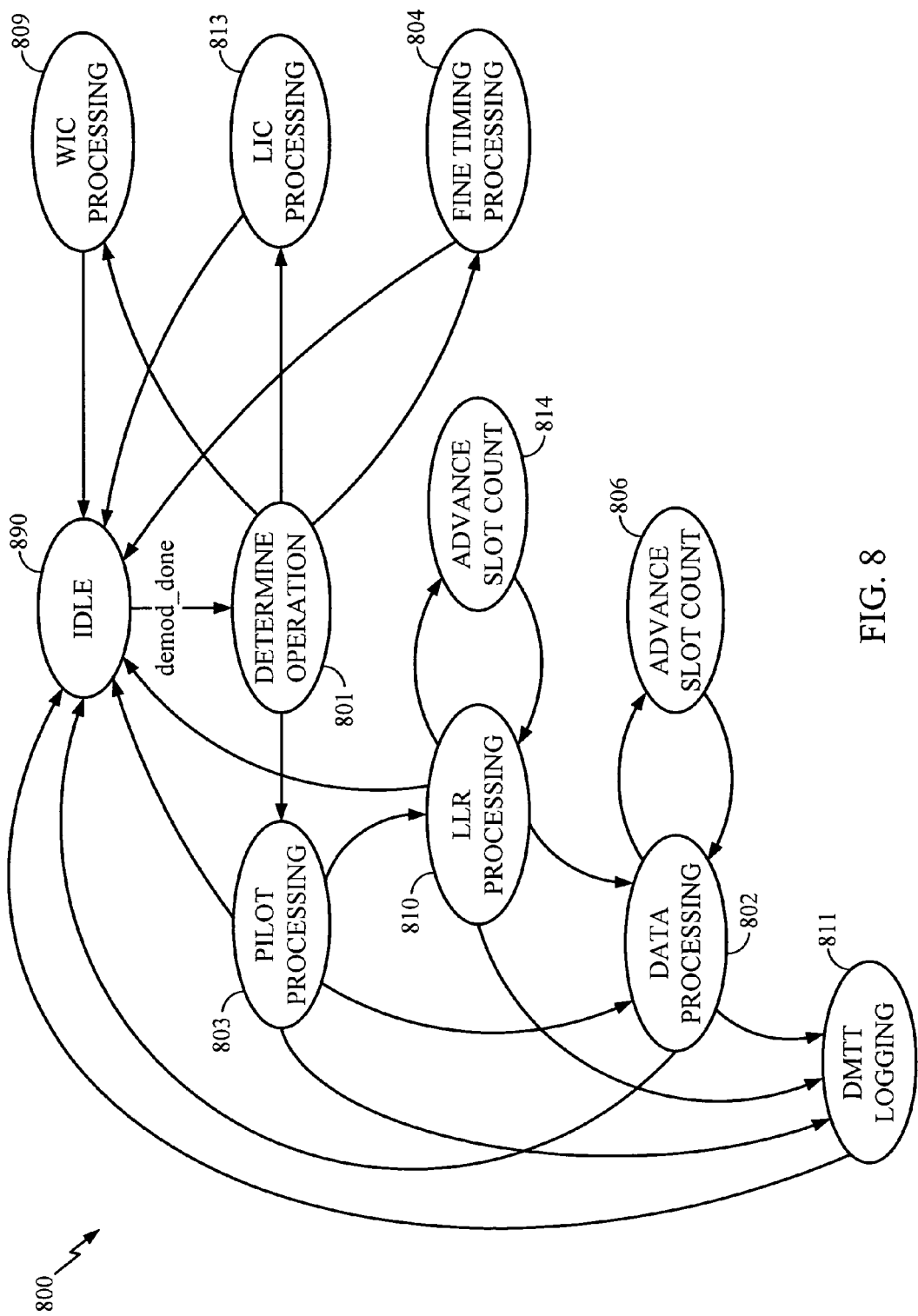
FIG. 8 is a simplified state diagram of an embodiment of logical channel control logic.

FIG. 8 is a simplified state diagram 800 of a channel processing state machine. The channel processing state machine can use register settings to determine when and how to act upon incoming symbols of data. For any given symbol, the channel processing state machine may determine that the FFT processor is to perform any one of multiple functions.

The state machine for the channel processor can transition from an idle state 890 to an operation determination state 801 following demodulation of an incoming sample. The channel processing state machine can transition to states for extraction of pilot observations for channel estimation and computation of channel estimation 803, requesting dynamic time tracking adjustment (DMTT) from IFT block 11, data processing for any/all of the seven data slots 802, sending data to LLR block from any/all of the seven data slots 810, and special processing for special frame 0 symbols, WIC 809, LIC 813, and TDM2 fine timing processing 804.

Figure 9:
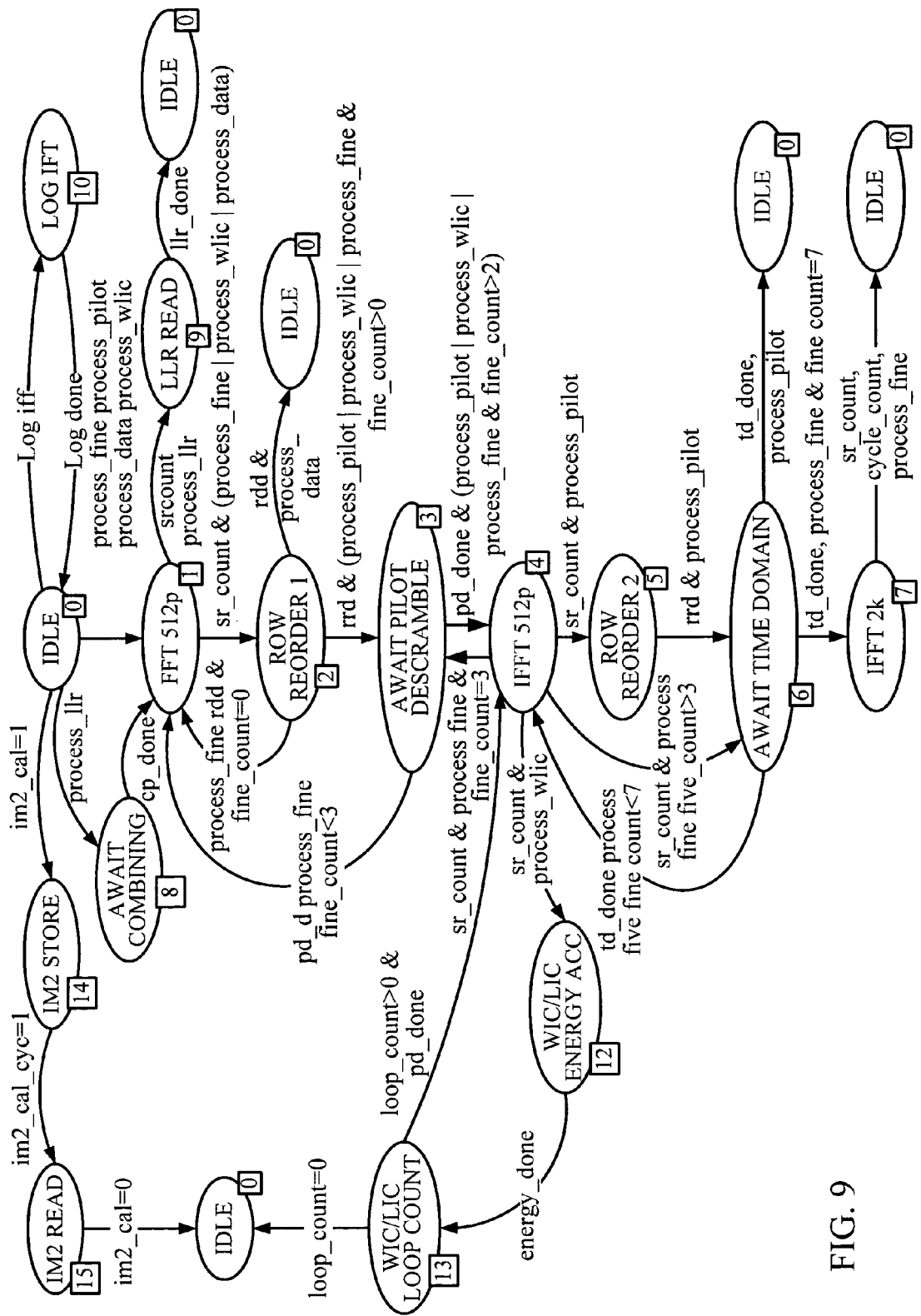
FIG. 9 is a simplified state diagram of an embodiment of an FFT processor.

FIG. 9 is a state diagram 900 for an embodiment of an FFT processor. The state diagram illustrates the state transitions for the performance of pilot processing, channel estimation, LLR processing, and FFT processing. As can be seen from the state diagram, FFT and IFFT operations are access throughout the machine, and many states transition to or through either an FFT operation or an IFFT operation.

Figure 10:
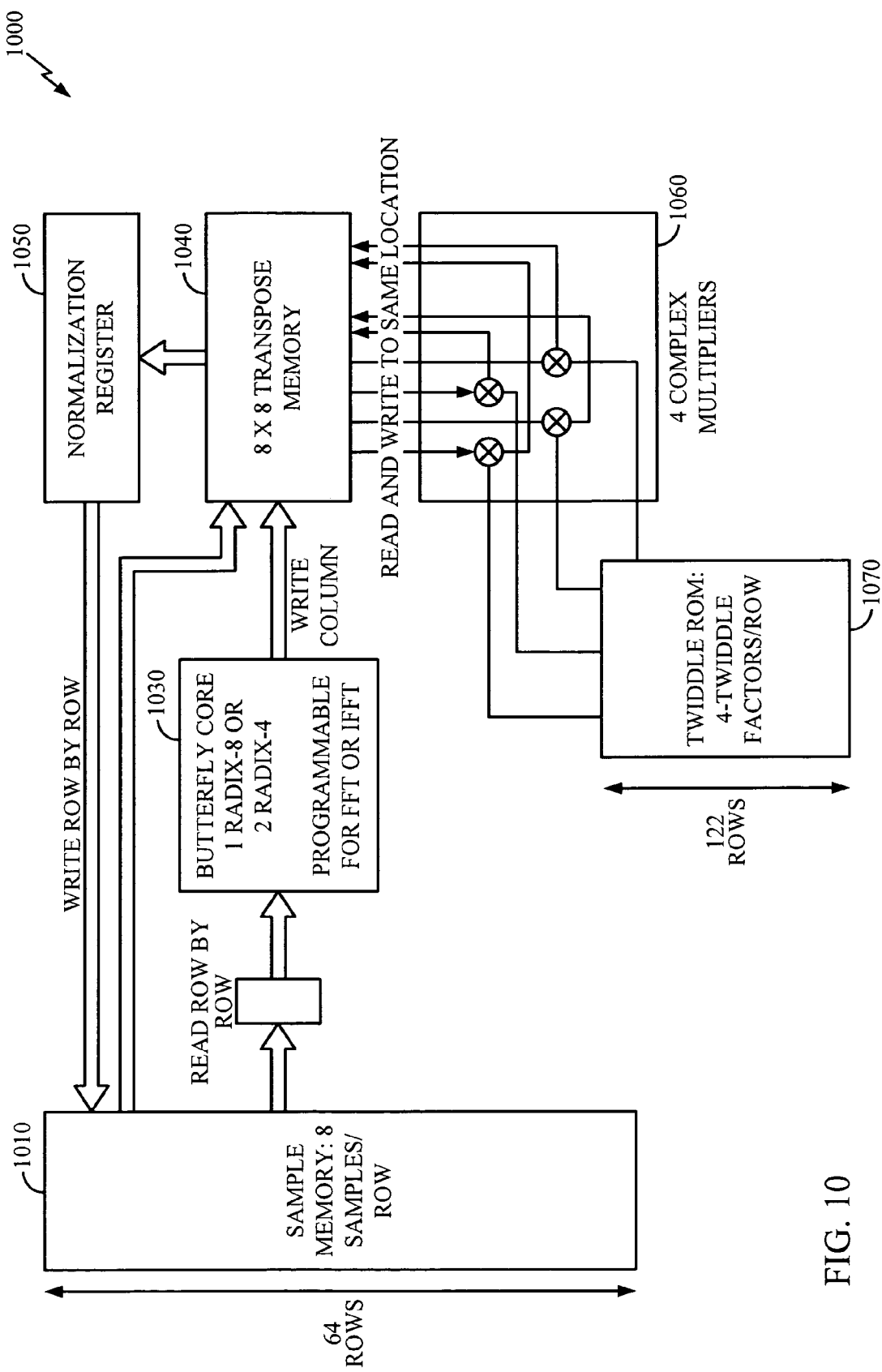
FIG. 10 is a simplified functional block diagram of an embodiment of an FFT engine.

FIG. 10 is a simplified functional block diagram of an embodiment of an FFT engine 1000. Because of the similarity of the FFT and IFFT operations, the FFT engine 1000 can be configured to perform either an FFT operation or an IFFT operation. The FFT engine is described in the context of a 512-point FFT. However, the FFT engine 1000 is not limited to such an embodiment, and changes tot e various elements of the FFT engine 1000 can allow it to perform other FFT dimensions.

The FFT engine 1000 is configured to perform a 512-point FFT implemented using Decimation in Frequency. The difference between decimation in frequency and decimation in time is the twiddle memory coefficients. The FFT engine 1000 advantageously uses radix-8 FFTs, such that the 512-point FFT can be performed in three stages. Of course, other radix values or combination of radix values can be used in the FFT engine 1000. For example, the FFT engine 1000 can use radix-2, radix-4, radix-8 FFTs or a combination of different radix FFTs.

The FFT engine 1000 includes sample memory 1010 for storage of the complex samples on which the FFT operation is performed. As discussed earlier, the sample memory can be shared among multiple blocks, and the processed FFT results as well as intermediate values can be stored in the sample memory locations for access by other modules.

The FFT engine 1000 includes a register 1020 for accessing the sample memory to read the samples row by row into a butterfly core 1030. The sample memory rows may also be directly read into rows of the transpose memory 1040, which can be register memory. The butterfly core 1030 is set up to perform FFTs or IFFTs, and can compute them as either a single radix-8 computation or as 2 radix-4 computations.

The results of each butterfly operation are written in a columnwise manner to a transpose memory 1040, that can include for example, an 8×8 configuration of transpose registers. The results from the transpose memory 1040 are read in a row or column manner and written to sample memory 1010 in a row manner. The columnwise write followed by the row read results in the transposition of the contents in the memory.

The twiddle factors for each stage of the FFT can be stored in a twiddle memory 1070, that can be a twiddle ROM. The twiddle factors can be arranged as four twiddle factors per row of memory.

A multiplier module 1060 including four complex multipliers can rotate the values in the transpose memory 1040 using the twiddle factors. The four complex multipliers coincide with the number of twiddle factors in a single row of twiddle memory 1070 to allow four complex multiplications in a single cycle.

The weighted values in the transpose memory 1040 are normalized in a normalization register 1050 before being written back to the originating locations of the sample memory 1010.

Figure 11:
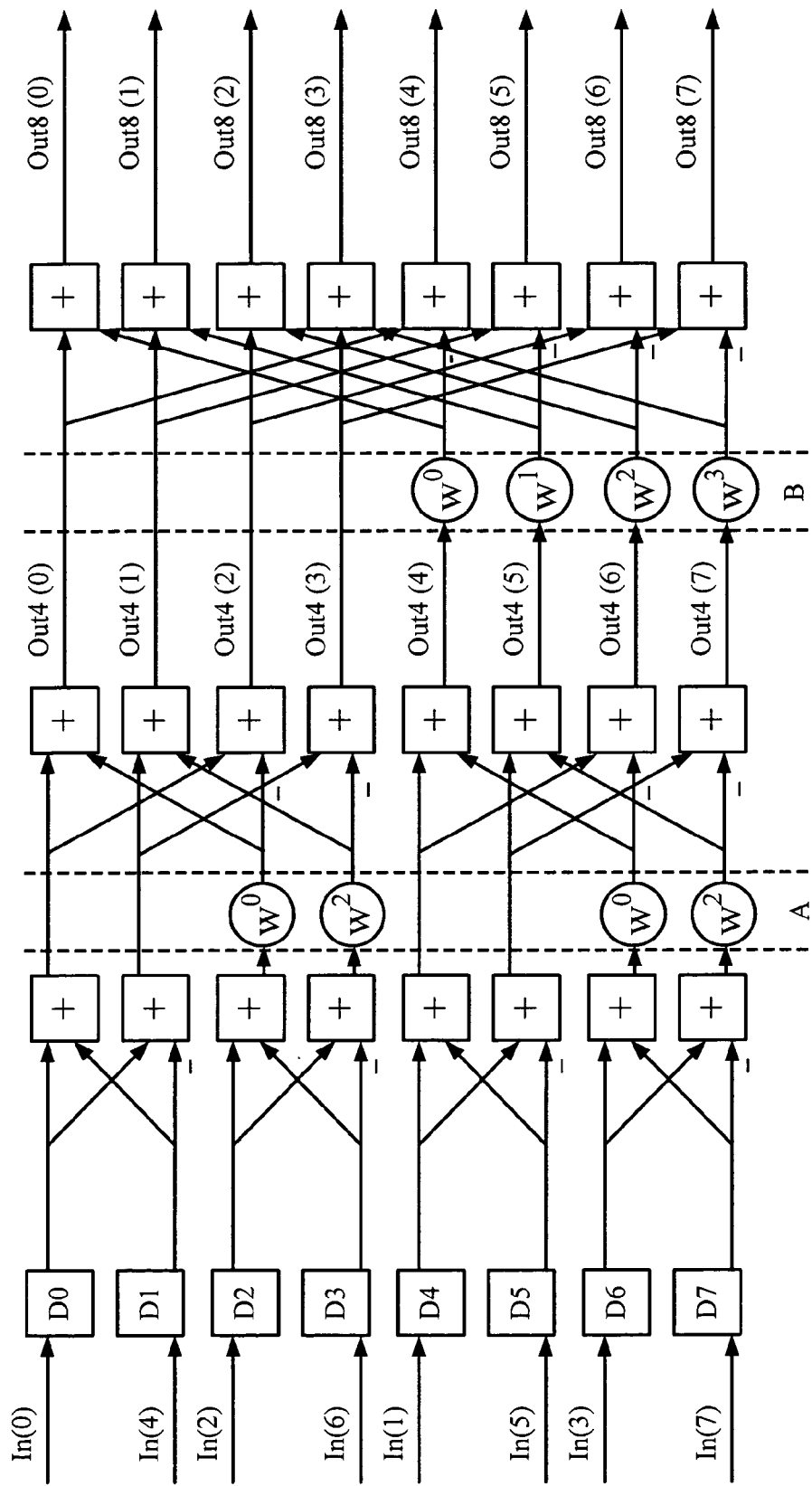
FIG. 11 is a simplified functional block diagram of an embodiment of a radix-8 FFT butterfly.

FIG. 11 shows the complete butterfly operations 1100 for a radix-8 FFT. By adjusting the twiddle multiplication values in regions A and B, the butterfly core can be changed to perform a radix-8 point IFFT. To perform the radix-4 computations, the results of the second-stage adders (shown in FIG. 11 as Out4) are used instead of the final summation (shown in FIG. 11 as Out8).

All values read from memories can be immediately registered. FIG. 11 shows the registers that are used when the core is operated in radix-8 mode. When the core is operated as 2 radix-4 sections, the input values come from registers in the register transposition block and, therefore, do not need to be registered again.

The inputs are also bit-reversed prior to the first set of adders. For radix-8 operation, this is the full 3-bit reversal: 0→0, 1→4, 2→2, 3→6, 4→1, 5→5, 6→3, 7→7. For radix-4 operation, each set of four inputs uses 2-bit reversal: 0→0; 1→2; 2→1; 3→3; 4→4; 5→6; 6→5; 7→7.

As values propagate through each set of adders, their bit widths increase by one to prevent saturation. The input values are represented by 9 bits. The first sums are represented by 10 bits. The Out4 values are represented by 11 bits, and the Out8 values are represented by 12 bits.

As shown in FIG. 11, the $4^{th}$ and $8^{th}$ sums in the A region must be multiplied by w(2) for FFTs. For IFFTs, this value becomes w(6). The determination of the twiddle factors W(k) are determined as follows: $W(k)=\exp(-j2\pi k/8)$.

The w(*) multiplications are implemented as follows:

$w^0$ equals $(I+jQ)*(1+j0)=I+jQ$, obviating the need for any modification.

$w^1$ equals $(I+jQ)*(1/\sqrt{2}-j/\sqrt{2})$. A complex multiplier is required. For the value of $1/\sqrt{2}$, a 9 bit signed constant is used.

$w^2$ equals $(I+jQ)*(0-j1)=Q-jI$. Instead of performing a 2's complement negation for the real part of the input and then adding, the value of the real part is left unchanged and the subsequent adder is changed to a subtractor to account for the sign change.

$w^3$ equals $(I+jQ)*(-1/\sqrt{2}-j/\sqrt{2})$. A complex multiplier is required. For the value of $1/\sqrt{2}$, a 9 bit signed constant is used.

$w^4$ equals $(I+jQ)*(-1+j0)=-I-jQ$. However, this value is not used for any FFT computations.

$w^5$ equals $(I+jQ)*(-1+j/\sqrt{2})$. A complex multiplier is required. For the value of $1/\sqrt{2}$, a 9 bit signed constant is used.

$w^6$ equals $(I+jQ)*(0+j1)=-Q+jI$. Instead of performing a 2's complement negation for the imaginary part of the input and then adding, the value of the imaginary part is left unchanged and the subsequent adder is changed to a subtractor to account for the sign change.

$w^7$ equals $(I+jQ)*(1/\text{sqrt}(2)+j/\text{sqrt}(2))$. A complex multiplier is required. For the value of $1/\text{sqrt}(2)$, a 9 bit signed constant is used.

Figure 12:
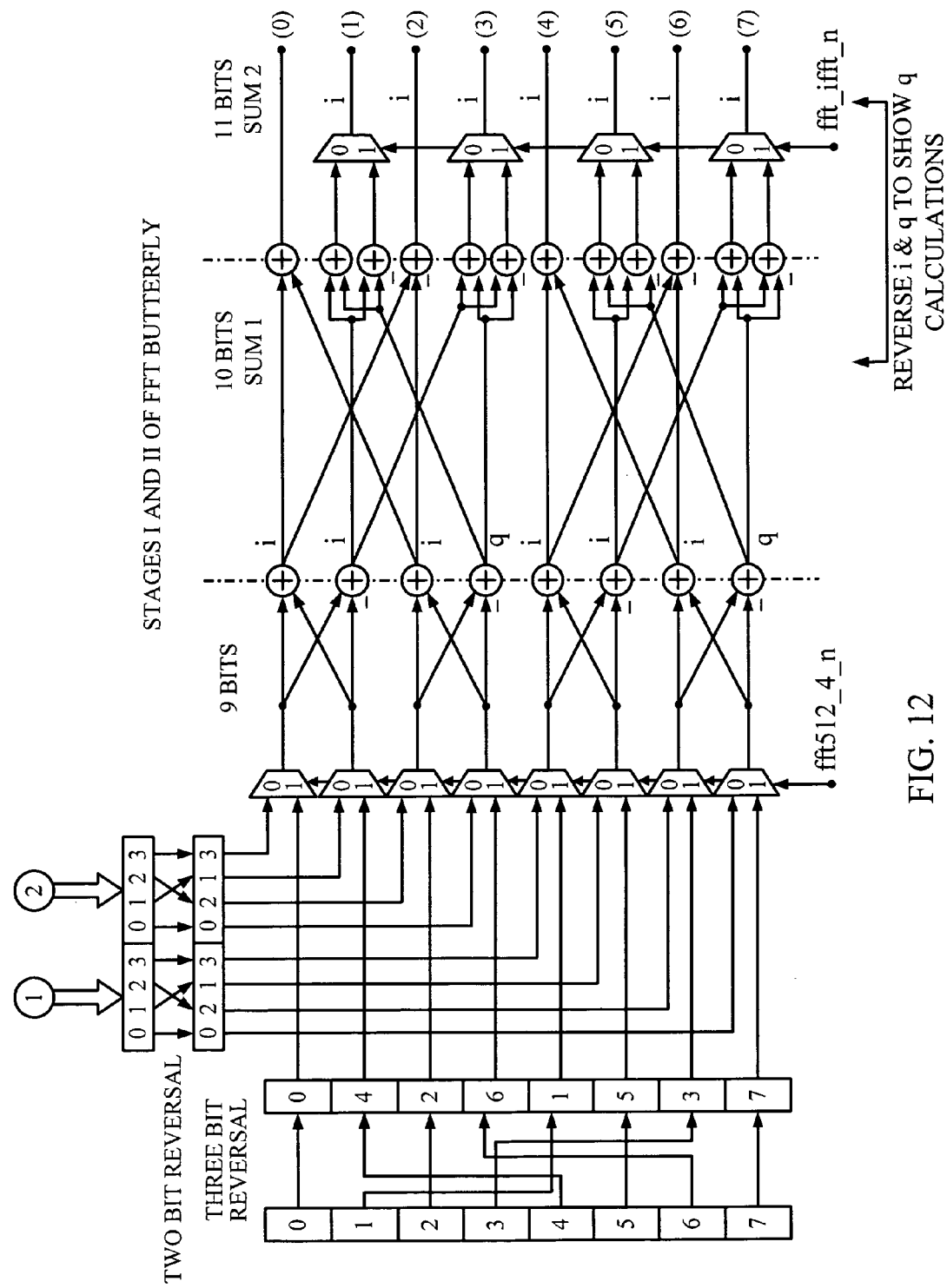
FIG. 12 is a simplified functional block diagram of an embodiment of a first two states of a radix-8 FFT butterfly.

FIG. 12 is a functional block diagram of an embodiment of a first two states of a radix-8 FFT butterfly. The partial butterfly core 1200 includes the computations from inputs through Out4 of the butterfly core 1100 shown in FIG. 11.

Two sets of adders are used for the $4^{th}$ and $8^{th}$ summations. One set computes w(2), while the other computes w(6). The ff_ifft_n signal controls which summation to use.

Figure 13:
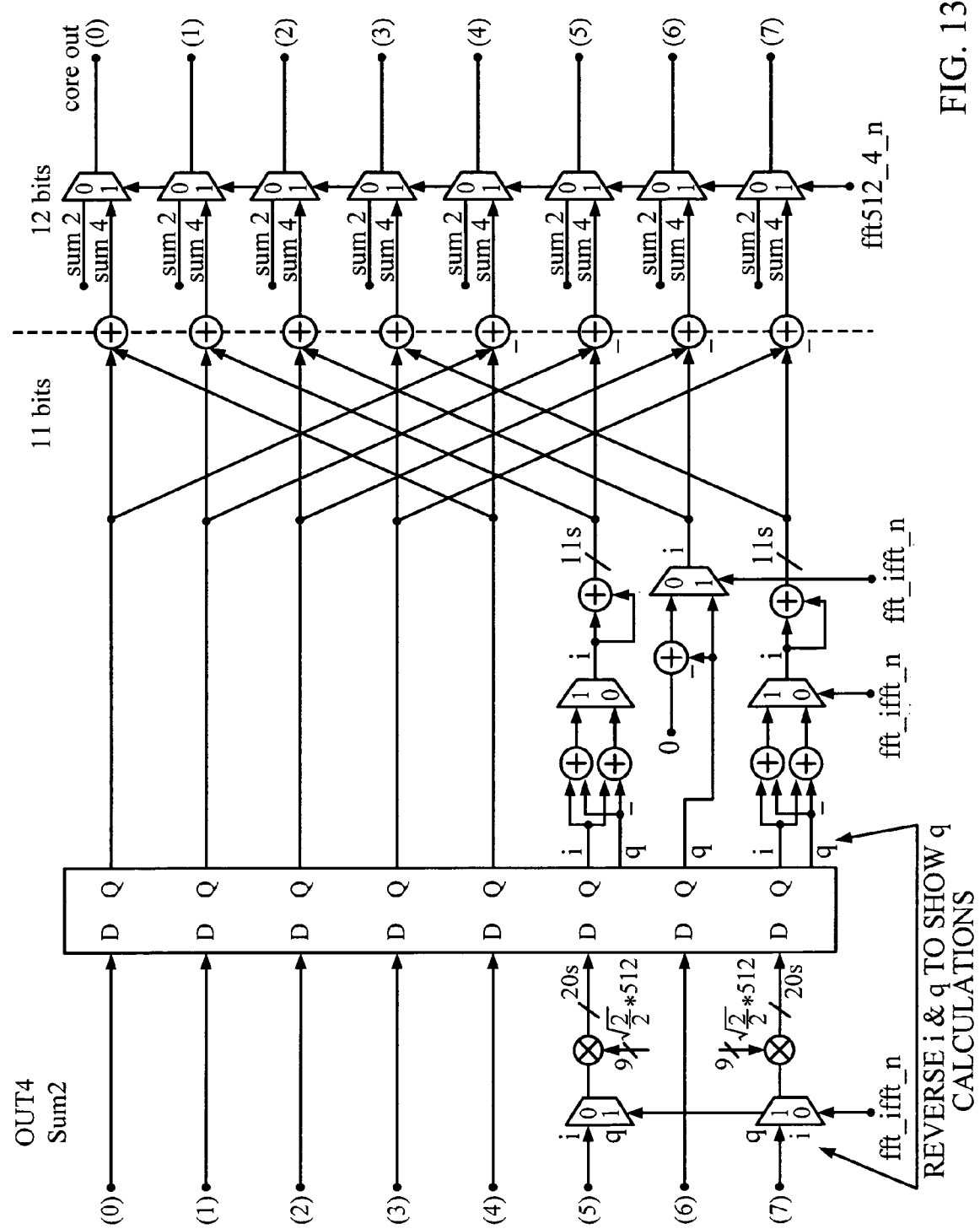
FIG. 13 is a simplified functional block diagram of an embodiment of a stage of a radix-8 FFT butterfly.

FIG. 13 is a functional block diagram of an embodiment of the final stage of the radix-8 FFT butterfly. The partial butterfly core 1200 includes the computations from Out4 to the output of the butterfly core 1100 shown in FIG. 11.

Real complex multipliers are required for the $6^{th}$ and $8^{th}$ values in the B region.

When performing an FFT, these will be w(1) and w(3).

When performing an IFFT, these will be w(7) and w(5), respectively.

For w(1)/w(7), the product sums are:

$P=1/\text{sqrt}(2)$, $W(1)=PI+PQ+j(-PI+PQ)$ $W(7)=PI-PQ+j(PI+PQ)$

The fft_ifft_n signal is used to steer the input values to the adder and subtractor, and to steer the sum and difference to their final destination. This implementation requires only two multipliers and two adders (one adder and one subtractor).

For w(3)/w(7), the product sums are:

$P=1/\text{sqrt}(2)$, $W(3)=-PI+PQ+j(-PI-PQ)$ $W(5)=-PI-PQ+j(PI-PQ)$

Instead of using P, fft_core uses $R=-1/\text{sqrt}(2)$ for these product sums. Using R, the equations then become:

$W(3)=RI-RQ+j(RI+RQ)$ $W(5)=RI+RQ+j(-RI+RQ)$

These products sums are 20 bits wide, carrying two sign bits. When the products sums are added, they become 20 bits wide, carrying one sign bit. These summations are then normalized back to 11 bits by rounding the eight least-significant bits (LSBs) and saturating one MSB.

The signal fft_ifft_n is used to steer the input values to the adder and subtractor, as well as the sum and difference to their final destination. As before, only two multiplier and two adders (one adder and one subtractor) are required.

The trivial multiplication, w(2) or w(6) in region B is handled the same as for region A.

To meet timing, all these computation typically cannot be done in a single clock cycle without incorporating excess hardware. A set of registers were added to capture most of the Out4 values. The Out4 values for the $6^{th}$ and $8^{th}$ are multiplied by the constants P and R before being registered. This placement of the registers balances the computations for the worst-case paths as follows:

First cycle: Multiplexer=>adder=>adder=>multiplexer=>multiplier

Second cycle: Adder=>multiplexer=>adder=>adder

Finally, the fft512_4_n signal is used to send out either the Out4 or Out8 values. The Out4 values are sign-extended from 11 bits to 12 bits.

The FFT block uses three passes through the radix-8 butterfly core to perform a single 512 point FFT. To accomplish this, the results from the first two passes must have some of their values multiplied by twiddle values and normalized. Because eight values are stored in a single row of memory, the ordering of the values as they are read is different than when values are written back. If a 2 k I/FFT is performed, memory values must be transposed before being sent to the butterfly core.

The radix-8 FFT uses 8×8 registers. All 64 registers receive input from the butterfly core. 56 of the registers receive input from the complex multipliers. 32 registers receive input from main memory in the memory architecture. Each of the registers can have a 2:1 or 3:1 multiplexer on its input. Inputs from main memory are written to a row of registers. Inputs from the butterfly core are written to columns of registers. Inputs from the complex multipliers are performed in groups.

All 64 registers send output to main memory through a normalization computation and register. The order of normalization is different for each type and stage of the I/FFT.

All 64 registers can send output to the complex multipliers. 56 registers require twiddle multiplication and 32 registers require squaring. 32 registers have their values sent to the butterfly core.

Values are sent to the normalization circuit row by row for: Data FFTs, Channel Estimation FFTs, WIC/LIC processing, and Fine Timing IFFTs.

Values are sent column by column for Channel Estimation IFFTs, Pilot FFTs, and IFFTs.

When values are sent to the butterfly core, they are sent column by column. When values are sent to the complex multipliers, they are done in groups.

Figure 14:
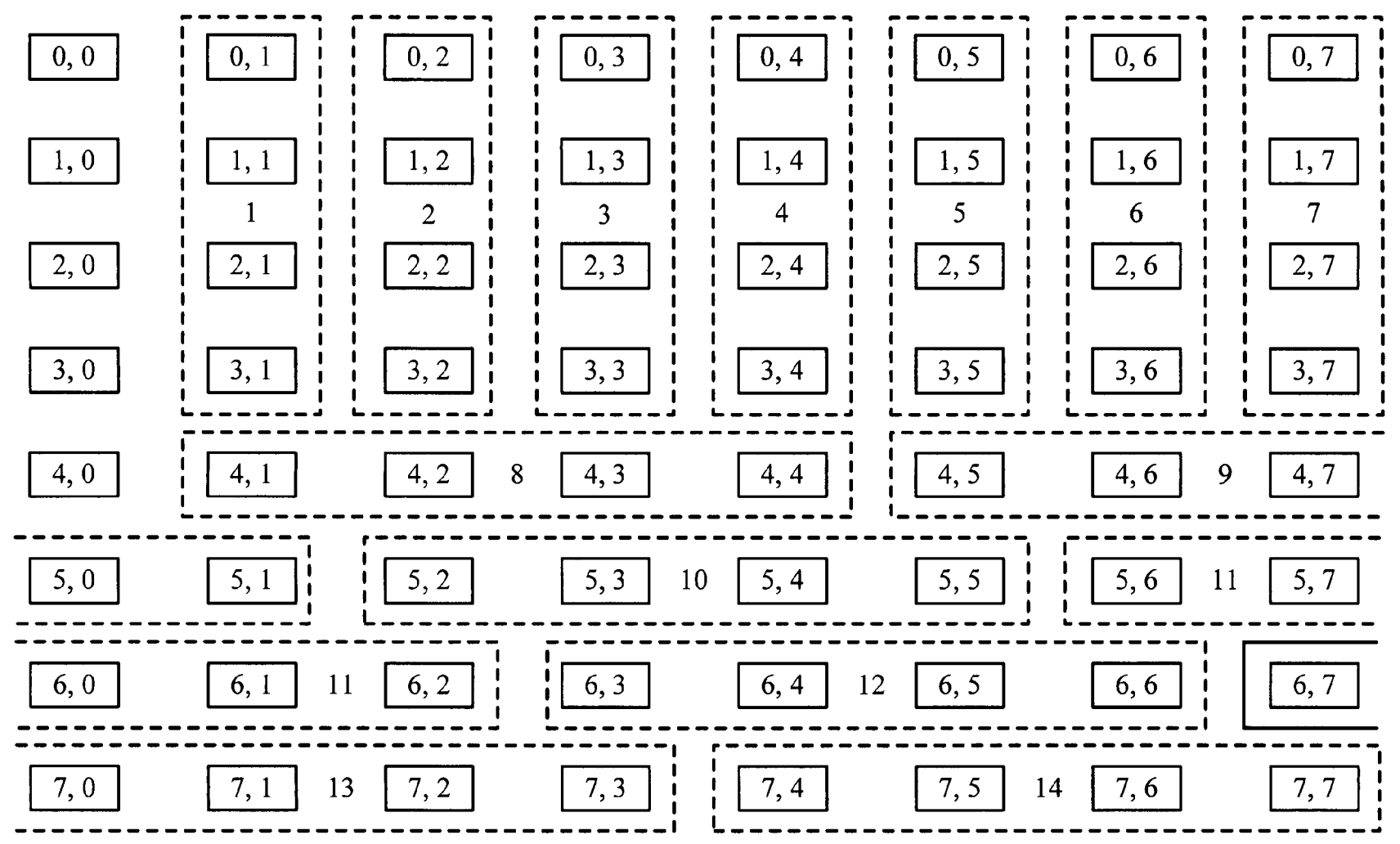

FIG. 14 is a simplified representation of a transpose memory 1400 showing the twiddle multiplication order in a radix-8 FFT. To reduce the total number of cycles required to perform the entire radix-8 FFT, the FFT operation is highly pipelined. Once values are output from the butterfly core and registered in the transpose memory 1400, they can be sent for twiddle multiplication.

The ordering of the twiddle multiplications is based on values being registered from the butterfly core column by column, and having twiddle multiplied values sent to memory row by row. At a minimum, eight read plus eight write cycles are required for the entire radix-8 FFT operation. If at least 16 cycles available, using four complex multipliers for twiddle operations requires 14 cycles. Any fewer multipliers would stall the memory write back operation, while any additional multipliers would be excess hardware that would idle for at least half the pipeline, resulting in wasted resources. In the implementation shown in FIG. 10, twenty one cycles are required for the entire radix-8 FFT operation.

The values in the first column of the transpose memory 1400 of FIG. 14 do not require twiddle multiplication. Once the second column is written, the values in group 1 can be sent to the complex multipliers. This is repeated until group 7. All values in the first seven groups are adjacent in a columnwise fashion. At this point, the first 4 rows are ready to be sent to main memory while the bottom 4 rows are twiddle multiplied.

The remaining groups of values are retrieved in a row wise grouping. Each of the row wise groupings can be seen to be of adjacent row values, where the values are adjacent in a circular fashion. Thus, in group 9, for example, the value [4, 0] is circularly adjacent to the last value n the row [4, 7].

FIG. 15 is a simplified timing diagram of a pipelined radix-8, 512-point, FFT operation. The pipeline timeline 1500 in FIG. 15 shows the overlapping nature of the butterfly calculations, twiddle calculations, and normalization calculations for radix-8 computations.

During cycle 0, the first of eight values in the first row of memory are read (value 0 in FIG. 14). The value from memory is available to the FFT for the following cycle. The values from memory are registered before being acted upon. This results in a one-cycle delay for memory accesses. Thus, it is not until cycle_count=2 that the input core registers have data valid for the first memory row. To meet timing requirements, the butterfly computations take two cycles. When cycle_count=3, half of the butterfly computations have been performed for the first memory row. When cycle_count=4, the butterfly computations have been completed and the results are registered in the transposition register bank.

To have the correct twiddle coefficient values ready by cycle count=4, the address to the twiddle memory, tw_addr, must be driven when cycle_count=3. The coefficients will be registered when cycle_count=4 and available to multiply against the second set of butterfly results when cycle_count=5.

When cycle_count=11, the values for group 7 are being written back to the transposition register. At this point, the first four rows of FIG. 14 are complete and can be normalized and read back to memory.

When cycle_count=12, the first row of registers is read and the values are normalized. The normalized value is stored in a normalization register, separate from the 64 registers that comprise the transposition register. When cycle_count=13, the values from the normalization register are sent back to main memory. No twiddle multiplications take place during the third stage of any I/FFT. Thus, there is no problem writing back column by column (for Data FFTs) with this pipeline timing.

FIG. 16 is a simplified timing diagram 1600 of a pipelined 2048-point FFT. The pipelined timing diagram 1600 illustrates the operations for performing a 2048-point FFT from a set of 512-point FFT results.

The operation of the 2048-point FFT is very similar to the 512-point FFT. However, because 2048 is not a power of 8, the FFT performs a radix-4 operation on the results of a 512-point FFT.

When performing a 2048-point I/FFT, the results of four different 512 point I/FFTs undergo a radix-4 operation. One row is read from each of the four interlaces, 512 values that have each undergone a 512-point I/FFT.

The memory architecture allows the interlace value to be used as a multiplexer that selects among the four different interlaces in question, rather than as an address. Consequently, when cycle_cnt=1, the values from memory location 0 for all 4 interlaces are ready, and fft_intl is used to select to appropriate value. When cycle_cnt=5, all four rows have been read and the first two columns are sent to the butterfly core. The butterfly core performs two radix-4 calculations in one cycle and returns the value back to the transposition register. To reduce the complexity of the individual register inputs, the four values for the second column in each pair are captured in the bottom four registers of the column from which they originated. The radix-4 results are then squared using the sample complex multipliers that perform twiddle multiplication. When cycle_cnt=6, the squared values are ready for normalization before being written back to memory. Due to bit width constraints, a different normalization is performed on the squared values. The normalized values are written to the Initial Fine Timing block, IFT.

Twiddle coefficients are organized in a memory with four values on each row. It can be advantageous to store the twiddle values in rows of memory associated with particular stages of the FFT rather than attempt to compute the values or store a non-redundant set of twiddle values and attempt to address the desired values.

The 56 multiplications are performed four per cycle, thus requiring 14 cycles. To determine the location of the various twiddle coefficients, the 512-point and 64-point coefficients matrices need to be overlaid with the multiplication order given in FIG. 14. When a row of data is completed, it is written back to the memory bank.

After the first eight rows (0, 8, 16, etc.) are written back, the next eight rows are read. For the first stage, these will be rows 1, 9, 17, etc. After rows 7, 15, 23, etc are processed, the FFT will advance to the second stage. For the second and third stages, the rows are accessed sequentially.

Register values are 12 bits wide. Twiddle coefficients are eight bits wide. The resultant 20-bit product is rounded back to 12 bits before being stored in a transposition register. Rounding occurs when the first or third stage of the channel estimation is performed. The $13^{th}$ bit is added to the 12 MSBs. For all other cases, no rounding is performed and all normalization is left until later. The 12 MSBs are simply returned.

The same 12×8 multipliers are used to perform squaring. The register values are 11 bits wide after the radix-4 operation. The register value is sign extended to 12 bits for one multiplier input. To get eight bits for the other multiplier input, the register value has its two LSBs rounded off and then saturation checked against the MSB. The 20-bit product is then rounded to 14 bits and saturation checked down to 11 bits. These 11 bit values are sent to the IFT block for further computations.

FIG. 17 is a simplified flowchart of a method 1700 of processing an OFDM signal. The method can be performed, for example, by the FFT processors of FIG. 3 or 4, or the user terminal of the system of FIG. 1.

The method 1700 begins at block 1710 where the FFT processor receives samples, where the samples can be complex samples of a received OFDM symbol, or of received OFDM symbol chips. The FFT processor proceeds to block 1720 and demodulates each of the received samples. The FFT processor proceeds to block 1730 and stores the demodulated samples in memory, for example, in sample memory banks of the memory architecture shown in FIG. 3.

The FFT processor proceeds to block 1740 and determines a channel estimate from the demodulated samples. In one embodiment, the demodulated samples are stored as multiple interlace samples, and the FFT processor determines a channel estimate based on a pilot interlace.

The FFT processor proceeds to block 750 and determines data subbands corresponding to one or more data interlaces. Each of the subbands can have encoded data thereon, and the FFT processor, or an associated module, can perform decoding of the subband data. In one embodiment, the subband data is processed in an LLR module in conjunction with the channel estimates for each of the subbands in the interlace.

FIG. 18 is a simplified flowchart of a method 1720 of demodulating symbol samples. The method 1720 can correspond to the demodulating act performed in the method of FIG. 17. The method 1720 of demodulating the samples can be performed by the FFT processors of FIG. 3 or FIG. 4. More particularly, the method of demodulating the symbol samples can be performed by the demodulation block of FIG. 3.

The demodulation block can include a number of counters, and can begin the method 1720 by resetting all counters at the beginning of the symbol. The beginning of the symbol can vary by a small amount, but the small amount may be insignificant for the purposes of the method of demodulating 1720 if the error in the start time is less than the duration of any OFDM cyclic prefix.

The demodulation block proceeds to block 1820 and determines an interlace from a plurality of interlaces within the OFDM symbol. The demodulation block can, for example, track the interlace with a modulo-M counter, where the number M corresponds to the number of interlaces. Initially, the counter can be set to zero, and can increment after each sample.

The demodulation block proceeds to block 1830 and rotates the received sample. In one embodiment, the demodulation block rotates the received symbol by a fixed value that is determined based on the interlace. Thus, for an OFDM symbol having eight interlaces, the input samples will be rotated by one of eight phases.

After rotating the sample, the demodulation block proceeds to block 1840 and accumulates the rotated samples. The demodulation block can be configured to accumulate M rotated samples of P interlace values. That is, where the OFDM symbol includes M interlaces, with each interlace having P subbands, the demodulation block can rotate the first P samples and store them and then rotate and accumulate samples in a modulo-P configuration, until all samples of a symbol have been received, rotated, and accumulated.

After each accumulation, the demodulation block proceeds to decision block 1850 to determine if all symbol samples have been demodulated. The demodulation block can determine the completion of the symbol samples, for example, by determining that the Pth value of the Mth interlace has accumulated M values.

If the symbol samples have been demodulated, the demodulation block proceeds to block 1860 and is done with the symbol demodulation. The demodulation block can proceed to the next symbol demodulation. If, at decision block 1850, the demodulation block determines that all symbol samples have not been processed, the demodulation block proceeds back to block 1820 to determine the interlace of the next arriving symbol sample.

Figure 19:
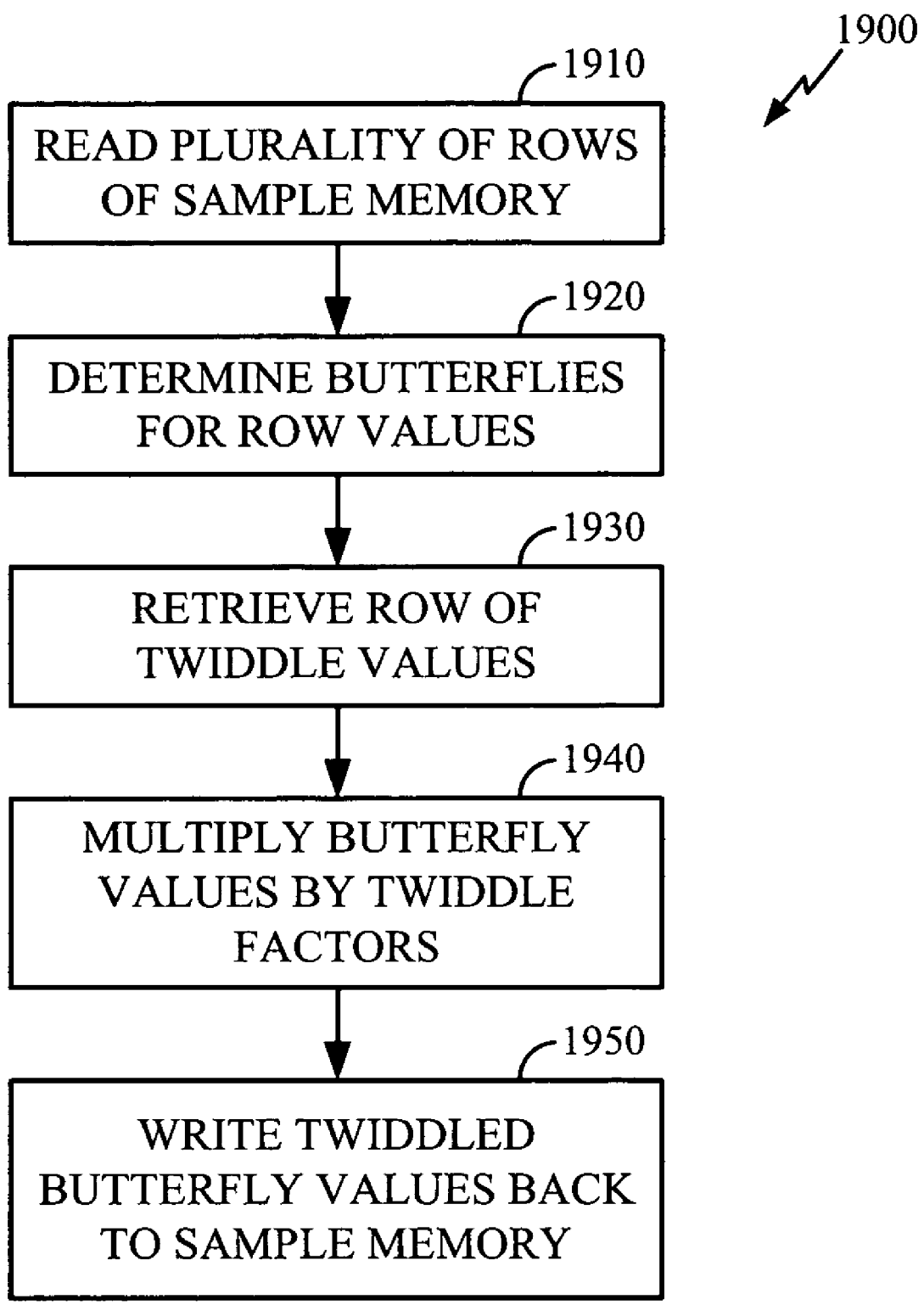
FIG. 19 is a simplified flowchart of a method of processing an OFDM signal.

FIG. 19 is a simplified flowchart of a method 1900 of processing an OFDM signal. The method 1900 can be performed by the FFT processors shown in FIG. 3 and FIG. 4. In particular, the method 1900 can be performed by the FFT engine of FIG. 10.

The method 1900 begins at block 1910 where the FFT engine reads a plurality of rows of sample memory. In one embodiment, the FFT engine registers each value read from sample memory.

The FFT engine proceeds to block 1920 and performs a butterfly on the values in one row. Advantageously, each row of sample memory can store a number of sample values equal to the FFT radix value. Thus, a single row read can load all of the values for a single radix-R FFT.

The FFT engine proceeds to block 1930 and retrieves from twiddle memory a row of twiddle factors. The row of twiddle factors can have fewer values than the row of sample memory. In one embodiment, each row of sample memory includes 8 sample values, and the twiddle memory stores four twiddle factors in each row.

The FFT engine proceeds to block 1940 and multiplies the butterfly values with the twiddle factors. In one embodiment, the number of complex multipliers is equal to the number of twiddle factors in a row of twiddle memory, and the twiddle factor multiplication can be executed in one cycle. Because there can be more butterfly values than twiddle factors, more than one multiplication step may need to be performed to complete each stage of the radix-R FFT. Each butterfly value is typically multiplied by only one twiddle factor per stage of the FFT. Some butterfly values may not need a complex multiplication function, because the twiddle factors can be performed without a multiplication.

After multiplying the butterfly values with the twiddle factors, the FFT engine writes the twiddled values back to memory, or to a register, and the processing of the row of values is complete. The FFT engine can thus perform a radix-R FFT, such as a radix-8 FFT, with only 8 reads from memory.

Figure 20:
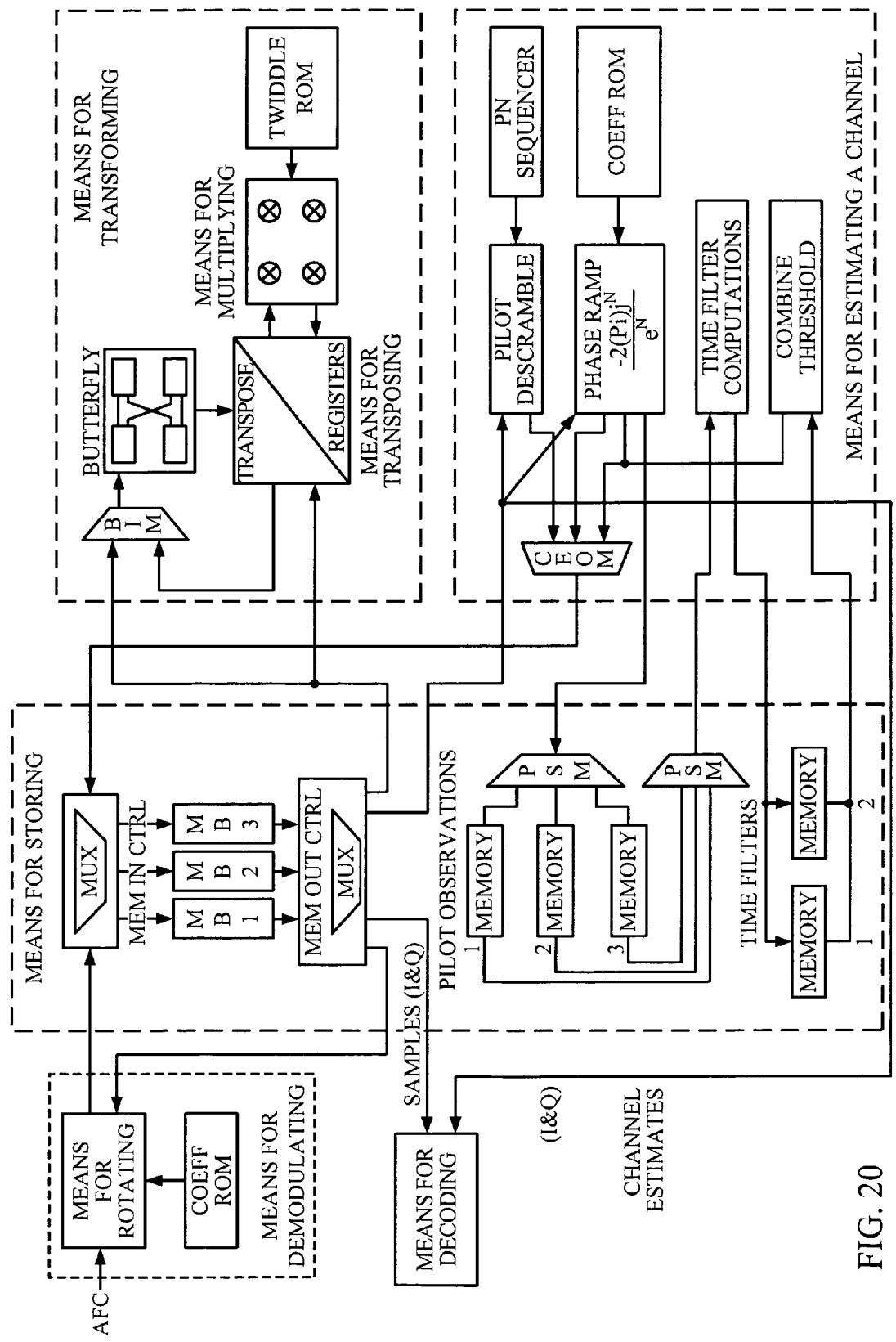
FIG. 20 is a simplified functional block diagram of an FFT processor.

FIG. 20 is a simplified functional block diagram of an FFT processor. The FFT processor includes a means for demodulation coupled to a means for storing data. The means for storing data is shared among the various modules. A means for transforming the samples can be coupled to the means for storing data. A means for estimating a channel can also be coupled to the means for storing data and can operate on the stored values. A means for decoding the subband information generated by the means for transforming the sample values can operate on the transformed sample values.

Figure 21:
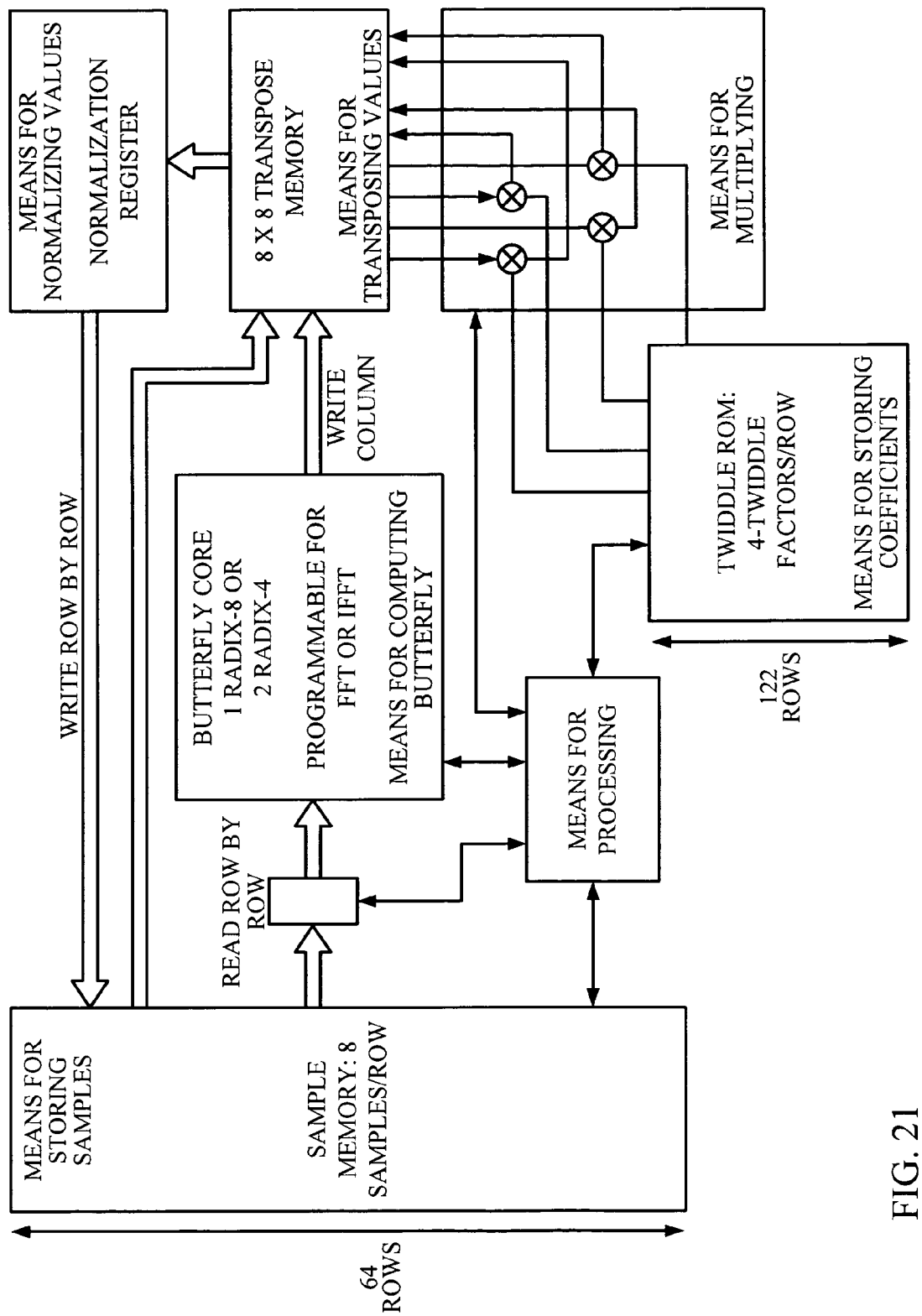
FIG. 21 is a simplified functional block diagram of an FFT engine.

FIG. 21 is a simplified functional block diagram of an FFT engine. The FFT engine includes means for storing samples, which can be demodulated OFDM symbol samples. The means for storing samples is coupled to a means for computing a butterfly. A means for processing can be configured to load the values from the means for storing samples into a register for operation by the means for computing a butterfly.

The means for computing a butterfly is configured to compute the butterfly on retrieved samples, and write the computed butterfly values to a means for transposing values. The data can be written to the means for transposing values, for example, in a columnwise manner and read in a row-wise manner to enable a transposition of the values.

A means for storing coefficients can be used to store twiddle factors in multiple rows. A means for normalizing values can be used to normalize the values from the means for transposing values.

A number of FFT processors, FFT engines, and methods of processing OFDM symbols have been described. The integration of multiple modules using shared memory architecture can greatly simplify an OFDM receiver design. The FFT engine can be embodied in such a manner to greatly reduce the FFT cycle count, while not underutilizing any expensive resources, such as complex multipliers.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module encoded on a tangible computer-readable storage medium and executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A Fast Fourier Transform (FFT) processing apparatus, the apparatus comprising:
   a sample memory having a number of samples values stored in each row equal to a radix of the FFT;
   a transpose memory;
   a butterfly core configured to receive a row of values from the sample memory, perform a butterfly operation on the values, and write results to a column of the transpose memory;
   a multiplier module configured to retrieve a predetermined number of adjacent values from the transpose memory, multiply each of the values with a twiddle factor, and write results to same locations of the adjacent values in the transpose memory; and
   a normalization register configured to receive values read from the transpose memory in a row-by-row manner, normalize the values, and write the normalized values row by row to original locations in the sample memory, for sample values corresponding to one of data FFTs, channel estimation FFTs, local and wide identification channel processing, or fine timing IFFTs, and further configured to receive values read from the transpose memory in a column-by-column manner, normalize the values, and write the normalized values row by row to original locations in the sample memory for sample values corresponding to one of estimation IFFTs, pilot FFTs, or pilot IFFTs.

2. The apparatus of claim 1, wherein the predetermined number of adjacent values are columnwise adjacent values.

3. The apparatus of claim 1, wherein the predetermined number of adjacent values are row-wise adjacent values.

4. The apparatus of claim 1, wherein the predetermined number of adjacent values are row-wise circularly adjacent values.

5. The apparatus of claim 1, wherein the butterfly core is adapted to perform a radix-R FFT and the transpose memory comprises an R×R register.

6. The apparatus of claim 1, further comprising a twiddle memory configured to store a number of twiddle factors within the same row equal to a number of complex multiplications that can be performed in a single clock cycle.

7. The apparatus of claim 1, wherein the multiplier module comprises a plurality of complex multipliers.

8. The apparatus of claim 1, wherein the multiplier module comprises a number of complex multipliers to perform a number of twiddle multiplications within a number of clock cycles equal to twice a butterfly radix value so as to perform the twiddle multiplications in an efficient pipeline.

9. A Fast Fourier Transform (FFT) processing apparatus, the apparatus comprising:
   a sample memory adapted to store eight complex sample values in each row;
   a transpose memory arranged as 8×8 storage locations;
   a radix-8 butterfly core adapted to retrieve a row of values, perform the radix-8 butterfly, and write output values columnwise into the transpose memory;
   a twiddle memory adapted to store four twiddle values in each row;
   a multiplier module having four complex multipliers, the multiplier module adapted to retrieve a row from the twiddle memory and four adjacent values from the transpose memory, perform a complex multiplication on the four values from adjacent transpose memory locations using values from the twiddle memory row, and write the product back to the four adjacent transpose memory locations; and
   a normalization register adapted to receive values read from the transpose memory in a row-by-row manner, normalize the values, and write the normalized values row by row to original locations in the sample memory, for sample values corresponding to one of data FFTs, channel estimation FFTs, local and wide identification channel processing, or fine timing IFFTs, and further adapted to receive values read from the transpose memory in a column-by-column manner, normalize the values, and write the normalized values row by row to original locations in the sample memory, for sample values corresponding to one of estimation IFFTs, pilot FFTs, or pilot IFFTs.

10. The apparatus of claim 9, wherein the adjacent transpose memory locations comprise columnwise adjacent memory locations.

11. The apparatus of claim 9, wherein the adjacent transpose memory locations comprise row-wise circularly adjacent memory locations.

12. The apparatus of claim 9, wherein the adjacent transpose memory locations comprise columnwise memory locations for a subset of cycles and row-wise circularly adjacent memory locations for a distinct subset of cycles.

13. A method of performing a Fast Fourier Transform (FFT) processing operation, the method comprising:
   reading a plurality of rows of sample memory equal to a radix of the FFT;
   determining the butterflies for values in a row of the sample memory and writing the butterfly values columnwise to a transpose memory;
   retrieving a row of twiddle factors from a twiddle ROM having a plurality of twiddle factor values stored in the row;
   multiplying a plurality of butterfly values with the twiddle factor values in a single cycle to generate twiddled butterfly values;
   writing the twiddled butterfly values back to memory locations of the plurality of butterfly values in the transpose memory;
   reading values from the transpose memory in a row-by-row manner if the plurality of rows read from the sample memory correspond to one of data FFTs, channel estimation FFTs, local and wide identification channel processing, or fine timing IFFTs;

reading values from the transpose memory in a column-by-column manner if the plurality of rows read from the sample memory correspond to one of estimation IFFTs, pilot FFTs, or pilot IFFTs;

sending, to a normalization register, the values read from the transpose memory;

normalizing the values in the normalization register; and writing the normalized values row by row to original locations in the sample memory.

14. The method of claim 13, further comprising retrieving the plurality of butterfly values from adjacent registers in the transpose memory.

15. The method of claim 14, wherein the adjacent registers comprise columnwise adjacent registers.

16. The method of claim 14, wherein the adjacent registers comprise circularly adjacent row-wise registers.

17. The method of claim 13, wherein retrieving the row of twiddle factors comprises retrieving a row from a twiddle memory having a number of rows determined based on a maximum FFT dimension.

18. The method of claim 13, wherein multiplying the plurality of butterfly values comprises performing a complex multiplication of the butterfly values with the twiddle factors.

19. A Fast Fourier Transform (FFF) processing apparatus, the apparatus comprising:

means for storing a number of samples values stored in each row equal to a radix of the FFT;

means for transposing a plurality of values;

means for operating a butterfly core configured to receive a row of values from sample memory, perform a butterfly operation on the values, and write results to a column of transpose memory;

means for multiplying a predetermined number of adjacent values from the transpose memory with a corresponding twiddle factor and writing results to same locations of the adjacent values in the transpose memory;

means for reading values from the transpose memory in a row-by-row manner for sample values corresponding to one of data FFTs, channel estimation FFTs, local and wide identification channel processing, or fine timing IFFTs;

means for reading values from the transpose memory in a column-by-column manner for sample values corresponding to one of estimation IFFTs, pilot FFTs, or pilot IFFTs; and means for normalizing the values read from the transpose memory prior to writing the values row by row to original locations in the sample memory.

20. A tangible computer-readable storage medium encoded with a computer program configured to cause a computer to perform the steps comprising:

reading a plurality of rows of sample memory equal to a radix of an FFT;

performing a butterfly operation on values in a row of the sample memory and writing resulting butterfly values columnwise to a transpose memory;

retrieving a row of twiddle factors having a plurality of twiddle factor values stored in the row;

multiplying a plurality of butterfly values with the twiddle factor values in a single cycle to generate twiddled butterfly values;

writing the twiddled butterfly values back to memory locations of the plurality of butterfly values;

reading values from the transpose memory in a row-by-row manner for the plurality of rows read from the sample memory corresponding to one of data FFTs, channel estimation FFTs, local and wide identification channel processing, or fine timing IFFTs;

reading values from the transpose memory in a column-by-column manner for the plurality of rows read from the sample memory corresponding to one of estimation IFFTs, pilot FFTs, or pilot IFFTs;

sending, to a normalization register, the values read from the transpose memory;

normalizing the values in the normalization register; and writing the normalized values row by row to original locations in the sample memory.

21. The apparatus of claim 1, wherein the predetermined number of adjacent values are columnwise adjacent values for a subset of cycles and row-wise circularly adjacent values for a distinct subset of cycles.

22. The apparatus of claim 9, wherein the adjacent transpose memory locations comprise row-wise adjacent values.

23. The apparatus of claim 9, wherein the complex multipliers of the multiplier module a number of twiddle multiplications within a number of clock cycles equal to twice a butterfly radix value so as to perform the twiddle multiplications in an efficient pipeline 24. The method of claim 14, wherein the adjacent registers comprise row-wise adjacent registers.

25. The method of claim 14, wherein the adjacent registers comprise column-wise adjacent registers for a subset of cycles and row-wise circularly adjacent memory locations for a distinct subset of cycles.

26. The apparatus of claim 19, wherein the predetermined number of adjacent values are columnwise adjacent values.

27. The apparatus of claim 19, wherein the predetermined number of adjacent values are row-wise adjacent values.

28. The apparatus of claim 19, wherein the predetermined number of adjacent values are row-wise circularly adjacent values.

29. The apparatus of claim 19, wherein the butterfly core is adapted to perform a radix-R FFT and the transpose memory comprises an R×R register.

30. The apparatus of claim 19, further comprising means for storing a number of twiddle factors within the same row equal to a number of complex multiplications that can be performed in a single clock cycle.

31. The apparatus of claim 19, wherein the means for multiplying comprises a plurality of complex multipliers.

32. The apparatus of claim 19, wherein the means for multiplying comprises a number of complex multipliers to perform a number of twiddle multiplications within a number of clock cycles equal to twice a butterfly radix value so as to perform the twiddle multiplications in an efficient pipeline.

33. The apparatus of claim 19, wherein the predetermined number of adjacent values are columnwise adjacent values for a subset of cycles and row-wise circularly adjacent values for a distinct subset of cycles.

34. The computer-readable storage medium of claim 20, wherein the steps further comprise retrieving the plurality of butterfly values from adjacent registers in the transpose memory.

35. The computer-readable storage medium of claim 34, wherein the adjacent registers comprise columnwise adjacent registers.

36. The computer-readable storage medium of claim 34, wherein the adjacent registers comprise circularly adjacent row-wise registers.

37. The computer-readable storage medium of claim 20, wherein the retrieving the row of twiddle factors comprises retrieving a row from a twiddle memory having a number of rows determined based on a maximum FFT dimension.

38. The computer-readable storage medium of claim 20, wherein the multiplying the plurality of butterfly values comprises performing a complex multiplication of the butterfly values with the twiddle factors.

39. The computer-readable storage medium of claim 34, wherein the adjacent registers comprise row-wise adjacent registers.

40. The computer-readable storage medium of claim 34, wherein the adjacent registers comprise column-wise adjacent registers for a subset of cycles and row-wise circularly adjacent memory locations for a distinct subset of cycles.

* * * * *